(12) United States Patent
Zhong et al.

(10) Patent No.: US 12,200,323 B2
(45) Date of Patent: Jan. 14, 2025

(54) CAMERA AUTHENTICATION METHOD AND CONTROL APPARATUS

(71) Applicant: HUAWEI TECHNOLOGIES CO., LTD., Guangdong (CN)

(72) Inventors: Steven Yin Zhong, Singapore (SG); Yanjiang Yang, Singapore (SG); Zhuo Wei, Singapore (SG)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 242 days.

(21) Appl. No.: 18/045,976

(22) Filed: Oct. 12, 2022

(65) Prior Publication Data
US 2023/0080111 A1    Mar. 16, 2023

Related U.S. Application Data

(63) Continuation of application No. PCT/CN2020/084775, filed on Apr. 14, 2020.

(51) Int. Cl.
*H04N 23/00* (2023.01)
*G06T 7/00* (2017.01)
*H04N 17/00* (2006.01)

(52) U.S. Cl.
CPC ........... *H04N 23/00* (2023.01); *G06T 7/0002* (2013.01); *H04N 17/002* (2013.01)

(58) Field of Classification Search
None
See application file for complete search history.

(56) References Cited

U.S. PATENT DOCUMENTS

| 8,988,219 B2 * | 3/2015 | McCloskey .......... G08B 29/046 340/500 |
| 2009/0154809 A1 | 6/2009 | Fridrich et al. |

(Continued)

FOREIGN PATENT DOCUMENTS

| CN | 106572310 A | 4/2017 |
| CN | 106791472 A | 5/2017 |

(Continued)

OTHER PUBLICATIONS

XP058035944, Dmitry Rublev et al:"Digital camera identification system", Security of Information and Networks, ACM, 2 Penn Plaza, Suite 701 New York NY 10121-0701 USA, Nov. 26, 2013 (Nov. 26, 2013), 4pages.

*Primary Examiner* — James M Hannett
(74) *Attorney, Agent, or Firm* — WOMBLE BOND DICKINSON (US) LLP

(57) ABSTRACT

A camera authentication method and a control apparatus are provided, and are applicable to an identity authentication of an on-board camera in the autonomous driving field. The method includes: obtaining one or more frames of a first image shot by a to-be-authenticated camera; determining one or more light intensity offset values of N photosensitive units based on the one or more frames of the first image; determining a matching degree between the light intensity offset values of the N photosensitive units and a preset N-dimensional vector; and if the matching degree meets a preset condition, determining that authentication of the to-be-authenticated camera succeeds, where the N photosensitive units are in a photosensitive layer of the to-be-authenticated camera, and the photosensitive layer includes M photosensitive units, where $N \leq M$. This technical solution is used to improve camera security.

17 Claims, 6 Drawing Sheets

(56) References Cited

U.S. PATENT DOCUMENTS

2009/0251555 A1* 10/2009 McCloskey ............ G06V 20/80
348/222.1
2015/0054958 A1 2/2015 Kim

FOREIGN PATENT DOCUMENTS

| | | | |
|---|---|---|---|
| CN | 106982273 | A | 7/2017 |
| CN | 107735783 | A | 2/2018 |
| CN | 107959688 | A | 4/2018 |
| CN | 108111497 | A | 6/2018 |
| CN | 108737815 | A | 11/2018 |
| CN | 109997137 | A | 7/2019 |
| CN | 110536067 | A | 12/2019 |
| CN | 110990823 | A | 4/2020 |
| EP | 3422159 | A1 | 1/2019 |
| WO | 2017037478 | A1 | 3/2017 |

* cited by examiner

|  | | | | | |
|---|---|---|---|---|---|
| | | | | | |
| | Photosensitive unit 1 | | Photosensitive unit 2 | | |
| | | | | | |
| | Photosensitive unit 7 | | Photosensitive unit 4 | Photosensitive unit 6 | |
| | | Photosensitive unit 3 | Photosensitive unit 5 | | |
| | | | | | |

Second row — row 2; Fourth row; Fifth row

FIG. 9

CAMERA AUTHENTICATION METHOD AND CONTROL APPARATUS

CROSS-REFERENCE TO RELATED APPLICATION

This application is a continuation of International Application No. PCT/CN2020/084775, filed on Apr. 14, 2020, the disclosure of which is hereby incorporated by reference in its entirety.

TECHNICAL FIELD

This application relates to the field of intelligent vehicles or autonomous driving, and in particular, to a camera authentication method and a control apparatus.

BACKGROUND

An autonomous vehicle is an intelligent vehicle that senses the ambient environment by using a millimeter-wave radar, a laser radar, a camera, and the like, and performs decision-making and control by using advanced computer technologies, to implement unmanned driving. Multiple cameras are installed on the autonomous vehicle in different directions, and the cameras play an important role in the autonomous vehicle. The cameras transmit video data to an on-board control apparatus. The on-board control apparatus analyzes the video data, so as to identify a road condition, determine how the vehicle should be driven based on the road condition, and then send an instruction to a steering apparatus, a power apparatus, or another apparatus to execute a corresponding driving action. The video data input by the cameras is a basis for the on-board control apparatus to determine how to drive. If a camera is maliciously replaced with a camera carrying a malicious program, the malicious program may tamper with the video data and deceive the on-board control apparatus, and even intrude the entire autonomous driving system and perform remote control by using the camera. Therefore, camera security is one of important factors for vehicle security.

Therefore, how to improve the camera security is an urgent problem to be resolved.

SUMMARY

This application provides a camera authentication method and a control apparatus (e.g., a camera authentication apparatus), to improve camera security.

According to a first aspect, this application provides a camera authentication method. The method includes: obtaining one or more frames of a first image shot by a to-be-authenticated camera; determining one or more light intensity offset values of N photosensitive units based on the one or more frames of the first image; determining a matching degree between the light intensity offset values of the N photosensitive units and a preset N-dimensional vector; and if the matching degree meets a preset condition, determining that authentication of the to-be-authenticated camera succeeds, where the N photosensitive units are in a photosensitive layer of the to-be-authenticated camera, and the photosensitive layer includes M photosensitive units, where N≤M.

Based on the foregoing solution, the one or more frames of the first image shot by the to-be-authenticated camera are obtained. The light intensity offset values of the N photosensitive units is determined based on the one or more frames of the first image. The matching degree is determined between the light intensity offset values of the N photosensitive units and the preset N-dimensional vector. If the matching degree meets a preset condition, that is, if the light intensity offset values of the N photosensitive units and the preset N-dimensional vector match, it is determined that the authentication of the to-be-authenticated camera succeeds. In this way, camera security is improved. In this solution, physical characteristics of the to-be-authenticated camera are used. For example, the light intensity offset value of the photosensitive unit of the to-be-authenticated camera is used as a to-be-authenticated fingerprint, and the identity authentication is performed on the to-be-authenticated camera based on the to-be-authenticated fingerprint. Further, a digital certificate or key does not need to be installed in the to-be-authenticated camera, and this avoids impact, on authentication security, caused by exposure of the digital certificate or key in the to-be-authenticated camera. In addition, an image of the to-be-authenticated camera is extracted, and the to-be-authenticated camera needs to provide only an inherent video or image and does not need to provide other authentication information. For example, there is no need to perform preprogramming or another modification on the to-be-authenticated camera, thereby reducing development costs.

In some embodiments, one or more light intensity offset values of M photosensitive units may be determined based on the one or more frames of the first image. One or more largest light intensity offset values of N photosensitive units in the light intensity offset values of the M photosensitive units may be used as the light intensity offset values of the N photosensitive units. Alternatively, the N photosensitive units may be determined from the M photosensitive units in the photosensitive layer. Specifically, the N photosensitive units are a photosensitive unit in N preset positions in the photosensitive layer of the to-be-authenticated camera. Then, the light intensity offset values of the N photosensitive units is determined based on the one or more frames of the first image and the photosensitive unit in the N preset positions.

Based on the foregoing solution, the largest light intensity offset values of N photosensitive units in the light intensity offset values of the M photosensitive units are used as the light intensity offset values of the N photosensitive units, so that the N photosensitive units with the largest light intensity offset values in the entire photosensitive layer can be determined. Based on the light intensity offset values of the N photosensitive units with the largest light intensity offset values, when the light intensity offset values of the N photosensitive units are matched with the preset N-dimensional vector, the matching degree between the light intensity offset values of the N photosensitive units and the preset N-dimensional vector may be determined in a relatively accurate manner. Alternatively, the N photosensitive units are determined from the M photosensitive units of the photosensitive layer, and the light intensity offset values of the N photosensitive units are determined, so that the light intensity offset values of the N photosensitive units can be quickly determined, thereby improving a matching speed.

In some embodiments, for each frame of a plurality of frames of the first image, a light intensity offset value of the $k^{th}$ photosensitive unit in the N photosensitive units in the first image is determined, where $1 \leq k \leq N$; and an average value of light intensity offset values of the $k^{th}$ photosensitive unit in all the frames of the first image is determined as a light intensity offset value of the $k^{th}$ photosensitive unit.

Based on the foregoing solution, one frame of the first image of the to-be-authenticated camera may be obtained, and the light intensity offset value of the $k^{th}$ photosensitive unit in the first image is determined as the light intensity offset value of the $k^{th}$ photosensitive unit. To ensure accuracy, the plurality of frames of the first image of the to-be-authenticated camera may be further obtained, the light intensity offset value of the $k^{th}$ photosensitive unit in each frame of the first image is determined, and then an average value of light intensity offset values of the $k^{th}$ photosensitive unit in all the frames of the first image is determined as the light intensity offset value of the $k^{th}$ photosensitive unit.

In some embodiments, when the light intensity offset value of the $k^{th}$ photosensitive unit in each frame of the first image is determined, the determining may be performed, in the first image, based on a light intensity value of the $k^{th}$ photosensitive unit in the first image and a light intensity value of an adjacent photosensitive unit of the $k^{th}$ photosensitive unit in the first image. Specifically, there may be one adjacent photosensitive unit of the $k^{th}$ photosensitive unit, and a difference between the light intensity value of the $k^{th}$ photosensitive unit in the first image and a light intensity value of the one adjacent photosensitive unit in the first image may be determined as the light intensity offset value of the $k^{th}$ photosensitive unit in the first image. Alternatively, there may be a plurality of adjacent photosensitive units of the $k^{th}$ photosensitive unit, an average light intensity value of light intensity values of the plurality of adjacent photosensitive units in the first image may be determined, and then a difference between the light intensity value of the $k^{th}$ photosensitive unit in the first image and the average light intensity value is determined as the light intensity offset value of the $k^{th}$ photosensitive unit in the first image. The adjacent photosensitive unit of the $k^{th}$ photosensitive unit and the $k^{th}$ photosensitive unit may correspond to a same color and have a preset distance corresponding to the color.

Based on the foregoing solution, if incident light corresponding to the plurality of adjacent photosensitive units is the same, a difference between the light intensity values of the plurality of adjacent photosensitive units may be used as a to-be-authenticated fingerprint of the to-be-authenticated camera. Therefore, for any frame of the first image, it is determined, based on the light intensity offset value of the $k^{th}$ photosensitive unit and the light intensity offset value of the adjacent photosensitive unit of the $k^{th}$ photosensitive unit, that the light intensity offset value of the $k^{th}$ photosensitive unit is used as the to-be-authenticated fingerprint of the to-be-authenticated camera. Further, considering that each photosensitive unit has a corresponding color, when the light intensity offset value of the $k^{th}$ photosensitive unit is determined, the photosensitive unit that corresponds to a same color with the $k^{th}$ photosensitive unit, and that has a preset distance, corresponding to the color, from the $k^{th}$ photosensitive unit may be used as the adjacent photosensitive unit of the $k^{th}$ photosensitive unit.

In some embodiments, the light intensity offset values of the N photosensitive units are determined based on one or more frames of a second image shot by a preset camera, and the light intensity offset values of the N photosensitive units are used as the preset N-dimensional vector, so as to be used in identity authentication of the to-be-authenticated camera. That is, if the to-be-authenticated camera and the preset camera are the same camera, it may be understood that the preset N-dimensional vector is one or more light intensity offset values of the N photosensitive units that are determined based on the one or more frames of the second image shot by the to-be-authenticated camera.

In some embodiments, the matching degree between the light intensity offset values of the N photosensitive units and the preset N-dimensional vector may be a similarity between a first vector that is formed by the light intensity offset values of the N photosensitive units and the preset N-dimensional vector. The first vector is formed by the light intensity offset values of the N photosensitive units in a preset sequence. The similarity between the first vector and the preset N-dimensional vector is determined. If the similarity is greater than a similarity threshold, it is determined that authentication of the to-be-authenticated camera succeeds; or if the similarity is not greater than a similarity threshold, it is determined that authentication of the to-be-authenticated camera fails.

In some embodiments, the preset sequence is determined based on one or more positions of the N photosensitive units in the photosensitive layer of the to-be-authenticated camera. For an $X^{th}$ row of the photosensitive layer of the to-be-authenticated camera, photosensitive units located in the $X^{th}$ row of the N photosensitive units are determined, and a sorting result of light intensity offset values corresponding to the photosensitive units is determined in a left-to-right sequence of the determined photosensitive units, where X is greater than or equal to 1. The sorting result of the light intensity offset values corresponding to an $(X+1)^{th}$ row, an $(X+2)^{th}$ row, . . . , and an $(X+n)^{th}$ row is determined based on the operation of determining the sorting result of the light intensity offset values corresponding to the $X^{th}$ row, until sorting of the N light intensity offset values is completed. A sorting result of light intensity offset values corresponding to each row is concatenated in a sequence of the $X^{th}$ row, the $(X+1)^{th}$ row, the $(X+2)^{th}$ row, . . . , and the $(X+n)^{th}$ row, to obtain the first vector.

In some embodiments, the preset sequence is determined based on the magnitude of the light intensity offset values of the N photosensitive units. The light intensity offset values of the N photosensitive units are sorted in descending order and then used as the first vector.

According to a second aspect, this application provides a control apparatus (e.g., camera authentication apparatus). The control apparatus may be an on-board control apparatus, or a chip used for the on-board control apparatus. The control apparatus has the method for implementing any one of the first aspect or the possible implementations of the first aspect. The function may be implemented by hardware, or may be implemented by hardware executing corresponding software. The hardware or software includes one or more units or modules corresponding to the foregoing functions.

In some embodiments, the control apparatus includes: an obtaining module and a processing module.

The obtaining module is configured to obtain one or more frames of a first image shot by a to-be-authenticated camera.

The processing module is configured to determine one or more light intensity offset values of N photosensitive units based on the one or more frames of the first image. The N photosensitive units are in a photosensitive layer of the to-be-authenticated camera, and the photosensitive layer includes M photosensitive units, where N≤M.

The processing module is further configured to determine a matching degree between the light intensity offset values of the N photosensitive units and a preset N-dimensional vector; and if the matching degree meets a preset condition, determine that authentication of the to-be-authenticated camera succeeds.

In some embodiments, the processing module is specifically configured to: determine one or more light intensity offset values of the M photosensitive units based on the one or more frames of the first image, and use one or more largest light intensity offset values of N photosensitive units in the light intensity offset values of the M photosensitive units as the light intensity offset values of the N photosensitive units; or determine the light intensity offset values of the N photosensitive units based on the one or more frames of the first image and photosensitive units at N preset positions, where the N photosensitive units are the photosensitive units at the N preset positions in the photosensitive layer of the to-be-authenticated camera.

In some embodiments, the processing module is specifically configured to: for each frame of a plurality of frames of the first image, determine the light intensity offset value of the $k^{th}$ photosensitive unit in the N photosensitive units in the first image, where $1 \leq k \leq N$; and determine an average value of light intensity offset values of the $k^{th}$ photosensitive unit in all the frames of the first image as a light intensity offset value of the $k^{th}$ photosensitive unit.

In some embodiments, the processing module is specifically configured to: for any frame of the first image, determine a difference between a light intensity value of the $k^{th}$ photosensitive unit in the first image and a light intensity value of one adjacent photosensitive unit in the first image as the light intensity offset value of the $k^{th}$ photosensitive unit in the first image, where the adjacent photosensitive unit and the $k^{th}$ photosensitive unit correspond to a same color and have a preset distance corresponding to the color.

In some embodiments, the processing module is specifically configured to: for any frame of the first image, determine an average light intensity value of light intensity values of a plurality of adjacent photosensitive units in the first image; and determine a difference between the light intensity value of the $k^{th}$ photosensitive unit in the first image and the average light intensity value as the light intensity offset value of the $k^{th}$ photosensitive unit in the first image, where each of the plurality of adjacent photosensitive units and the $k^{th}$ photosensitive unit correspond to a same color and have a preset distance corresponding to the color.

In some embodiments, the preset N-dimensional vector is one or more light intensity offset values that are of the N photosensitive units and that are determined based on one or more frames of a second image shot by the to-be-authenticated camera.

In some embodiments, the processing module is specifically configured to: determine a similarity between a first vector and the preset N-dimensional vector, where the first vector is formed by the light intensity offset values of the N photosensitive units in a preset sequence; and if the similarity is greater than a similarity threshold, determine that authentication of the to-be-authenticated camera succeeds.

In some embodiments, the preset sequence is determined based on one or more positions of the N photosensitive units in the photosensitive layer of the to-be-authenticated camera; or the preset sequence is determined based on the magnitude of the light intensity offset values of the N photosensitive units.

For technical effects brought by the second aspect or the possible implementations, refer to the descriptions of the technical effects brought by the first aspect or the corresponding implementations.

According to a third aspect, this application provides a control apparatus. The control apparatus includes a processor, and when the processor executes a computer program or an instruction in a memory, the method according to any one of the first aspect or the possible implementations of the first aspect is performed.

According to a fourth aspect, this application provides a control apparatus. The control apparatus includes a processor and a memory. The memory is configured to store a computer program or an instruction; and the processor is configured to execute the computer program or the instruction stored in the memory, so that the control apparatus is enabled to perform the method according to any one of the first aspect or the possible implementations of the first aspect.

According to a fifth aspect, this application provides a control apparatus. The control apparatus includes a processor, a memory and a communications interface. The communications interface is configured to receive or send a signal; the memory is configured to store a computer program or an instruction; and the processor is configured to invoke the computer program or the instruction to perform the method according to any one of the first aspect or the possible implementations of the first aspect.

According to a sixth aspect, this application provides a control apparatus. The control apparatus includes a processor and an interface circuit. The interface circuit is configured to receive a code instruction and transmit the code instruction to the processor; and the processor runs the code instruction to perform the method according to any one of the first aspect or the possible implementations of the first aspect.

According to a seventh aspect, this application provides a computer-readable storage medium. The computer-readable storage medium is configured to store a computer program or an instruction; and when a computer reads and executes the computer program or the instruction, the method according to any one of the first aspect or the possible implementations of the first aspect is implemented.

According to an eighth aspect, this application provides a computer program product including an instruction. When a computer reads and executes the computer program product, the method according to any one of the first aspect or the possible implementations of the first aspect is implemented.

According to a ninth aspect, this application provides a chip. The chip includes a processor. The processor is coupled to a memory, and is configured to execute a computer program or an instruction stored in the memory; and when the processor executes the computer program or the instruction, the method according to any one of the first aspect or the possible implementations of the first aspect is implemented.

According to a tenth aspect, this application provides a chip. The chip is connected to a memory, and is configured to read and execute a software program stored in the memory, so as to implement the method according to any one of the first aspect or the possible implementations of the first aspect.

BRIEF DESCRIPTION OF DRAWINGS

FIG. 9 is a schematic diagram of position distribution of N photosensitive units in a photosensitive layer according to an embodiment of this application;

DESCRIPTION OF EMBODIMENTS

The following further describes in detail the embodiments of this application with reference to the accompanying drawings. In descriptions of the embodiments of this application, unless otherwise specified, "/" means "or". For example, A/B may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiment of this application, unless otherwise specified, "plurality of" means two or more than two.

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "for example", or the like is intended to present a relative concept in a specific manner.

Figure 1:
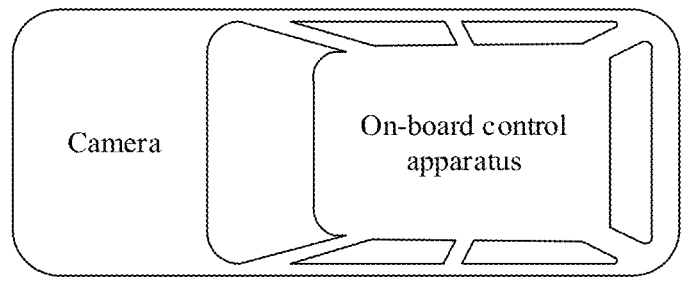
FIG. 1 is a schematic diagram of a network architecture applicable to an embodiment of this application.

FIG. 1 is a possible network architecture applicable to this application. The network architecture is applicable to an autonomous vehicle, and may include an on-board control apparatus and a camera controlled by the on-board control apparatus. There may be at least one camera, and the camera may be separately installed in the front, rear, or two sides of the autonomous vehicle, or in another position in which video or image data needs to be collected. The on-board control apparatus may perform operations of authenticating the camera, as a camera authentication apparatus.

The on-board control apparatus, for example, an on-board control center (on-board control center, OCC), is responsible for centrally managing various control functions of the vehicle. Alternatively, in addition to the OCC, the on-board control apparatus may be another apparatus that has a control function and that is installed on the vehicle. For example, if various terminal devices described below are located on the vehicle (for example, placed in the vehicle or installed in the vehicle), the terminal devices may be considered as on-board control apparatuses.

The terminal device may be a device that provides a user with voice and/or data connectivity. For example, the terminal device may include a handheld device with a wireless connection function, or a processing device connected to a wireless modem. The terminal device may communicate with a core network through a radio access network (radio access network, RAN), and exchange voice and/or data with the RAN. The terminal device may include user equipment (user equipment, UE), a wireless terminal device, a mobile terminal device, a device-to-device (device-to-device, D2D) communication terminal device, a V2X terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, a portable, pocket-sized, handheld, or computer built-in mobile apparatus. For example, the terminal device may include a device such as a personal communication service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device with relatively low power consumption, a device with a limited storage capability, or a device with a limited computing capability. For example, the terminal device may be an information sensing device, for example, a barcode, radio frequency identification (radio frequency identification, RFID), a sensor, a global positioning system (global positioning system, GPS), or a laser scanner.

As a sensor for assisting in vehicle autonomous driving, the camera may send video or image data collected by the camera to the on-board control apparatus, so that the on-board control apparatus makes a decision on a vehicle autonomous driving behavior based on the video or image data collected by the camera. Certainly, the autonomous vehicle may further include another sensor, for example, a millimeter-wave radar or a laser radar. The on-board control apparatus may make a decision based on data collected by all sensors, to improve autonomous driving security.

In order to ensure reliability of the data collected by the camera, the on-board control apparatus needs to authenticate an identity of the camera. There may be a plurality of trigger conditions for the on-board control apparatus to perform the identity authentication on the camera. In a first example, the on-board control apparatus performs the identity authentication on the camera based on a preset time. For example, the on-board control apparatus performs the identity authentication on the camera at a fixed moment every day. For another example, the on-board control apparatus performs the identity authentication on the camera at intervals of a preset time cycle. In a second example, the on-board control apparatus performs the identity authentication on the camera based on a preset event. For example, when determining that the autonomous vehicle starts an autonomous driving mode, the on-board control apparatus performs the identity authentication on the camera. For another example, when receiving a user instruction, the on-board control apparatus performs the identity authentication on the camera. Certainly, there may also be another trigger condition.

In an existing identity authentication manner, the on-board control apparatus mainly uses a certificate or a symmetric key to authenticate the camera. A certificate or a symmetric key needs to be deployed in the camera. However, currently, most cameras do not support a hardware security module. As a result, the certificate or the symmetric key deployed in the camera is easily extracted. Through reverse engineering, you can find the certificate or the symmetric key, or even an authentication algorithm. When the on-board control apparatus performs the identity authentication on the camera, there is insecurity.

Based on the foregoing problem, an embodiment of this application provides a camera authentication method, to fully use physical characteristics of the camera to implement the identity authentication on the camera without deploying the certificate or the key in the camera, thereby improving security of performing the identity authentication on the camera by the on-board control apparatus.

Figure 2:
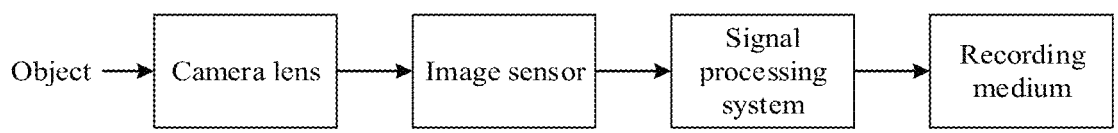
FIG. 2 is a schematic flowchart of camera imaging according to an embodiment of this application.

For example, an imaging principle of the camera is first described. As shown in FIG. 2, when shooting an object, the camera may collect, by using a camera lens, light reflected by the object, and focus the collected light to a light receiving surface of an image sensor. The image sensor converts an optical signal into a digital signal. After being processed and adjusted by a signal processing system, the signal is sent to a recording medium for recording or sent to a monitor or a display for displaying.

Figure 3:
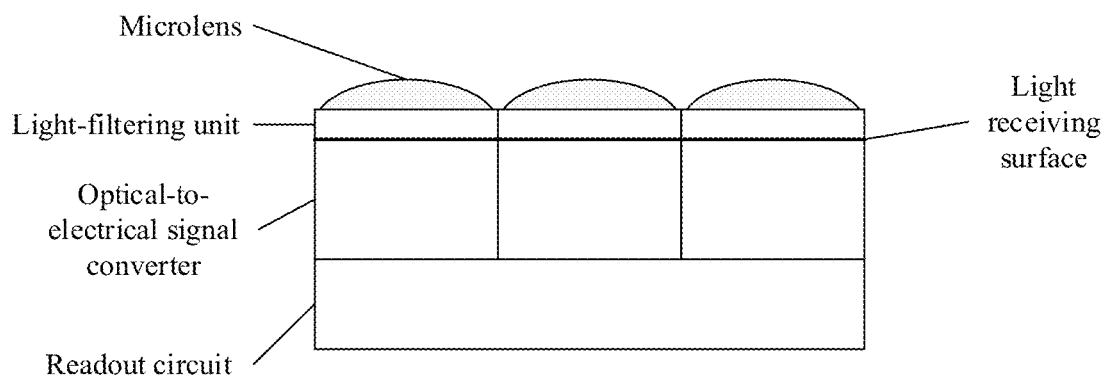
FIG. 3 is a schematic structural diagram of an image sensor according to an embodiment of this application.

The image sensor is a key component of camera imaging. Using a complementary metal oxide semiconductor (complementary metal oxide semiconductor, CMOS) image sensor as an example, the image sensor is essentially a pixel array including a plurality of pixel sensors. Each pixel sensor may convert a received optical signal into an electrical signal, and convert the electrical signal into a digital signal by using a readout circuit. In this way, a process of digitizing a real scene is completed. In FIG. 3, an internal structure of each pixel sensor is the same, and includes a microlens, a light-filtering unit, an optical-to-electrical signal converter, and a readout circuit. A microlens array has a spherical surface and a mesh lens, and the microlens collects incoming light and focuses the light to the light-filtering unit. The light-filtering unit may be green (green, G), red (red, R), blue (blue, B), clear (clear, C), or the like. Light of corresponding wavelengths may pass through the light-filtering unit of different colors. The optical-to-electrical signal converter may convert light sensed by the light receiving surface into an electrical signal, and read out the electrical signal by using the readout circuit.

Figure 4:
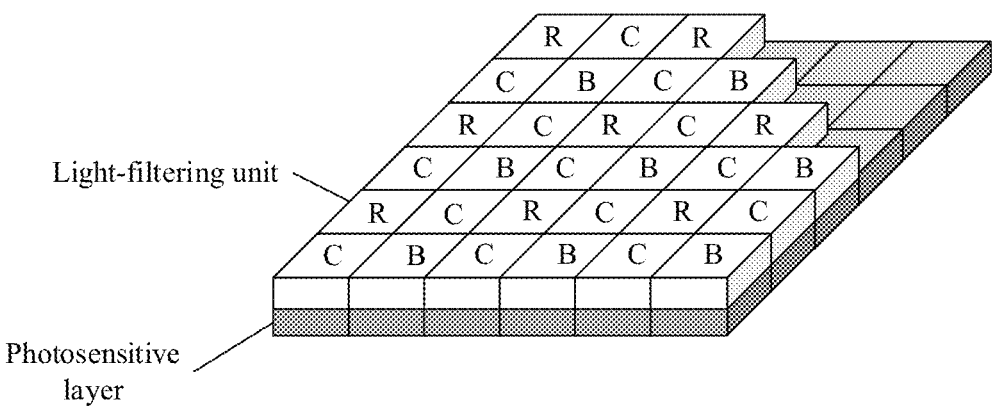
FIG. 4 is a schematic structural diagram of another image sensor according to an embodiment of this application.

FIG. 4 shows a structure of another image sensor according to this application. The image sensor includes a light-filtering layer and a photosensitive layer. The light-filtering layer is an array formed by M light-filtering units, the photosensitive layer is an array formed by M photosensitive units, and the light-filtering units and the photosensitive units are in a one-to-one correspondence. The photosensitive unit herein may be understood as a combination of an optical-to-electrical signal converter and a readout circuit in each pixel sensor shown in FIG. 3. The photosensitive unit may receive light filtered by the light-filtering layer, convert an optical signal into a digital signal, and output the digital signal. In other words, the light-filtering unit may filter incident light and then irradiate the incident light onto a corresponding photosensitive unit. The photosensitive unit senses a light intensity value of the light collected by the photosensitive unit. In actual application, a green light-filtering unit allows only green light to pass through, a red light-filtering unit allows only red light to pass through, a blue light-filtering unit allows only blue light to pass through, and a clear light-filtering unit allows light of all colors (including the red light, the green light, and the blue light) to pass through. The photosensitive unit may sense a light intensity value of light filtered out by the light-filtering unit corresponding to the photosensitive unit. For example, if the light-filtering unit corresponding to the photosensitive unit is a green light filtering unit, the photosensitive unit may sense a light intensity value of green light filtered out by the green light-filtering unit corresponding to the photosensitive unit. For another example, if the light-filtering unit corresponding to the photosensitive unit is a white light-filtering unit, the photosensitive unit may sense a light intensity value of white light filtered out by the white light-filtering unit corresponding to the photosensitive unit.

In an autonomous vehicle, when a camera shoots an image, incident light irradiates onto the camera. That is, the incident light irradiates onto each light-filtering unit of the light-filtering layer. The incident light is filtered by each light-filtering unit and then irradiated onto the photosensitive unit corresponding to each light-filtering unit. Each photosensitive unit senses a light intensity value of the light collected by the photosensitive unit, and sends the light intensity value to an on-board control apparatus. The on-board control apparatus evaluates, based on light intensity values sent by all photosensitive units, a light intensity value of another color that is filtered out by the light-filtering unit corresponding to each photosensitive unit, so that a color of a pixel corresponding to each photosensitive unit is determined, to generate the image shot by the camera. For one of the photosensitive units, a light-filtering unit corresponding to the photosensitive unit is green, and the photosensitive unit may sense the light intensity value of the green light filtered out by the light-filtering unit corresponding to the photosensitive unit. When generating an image, the on-board control apparatus may evaluate, based on the light intensity value of the green light sensed by the photosensitive unit and light intensity values of light of other colors (red and blue) sensed by photosensitive units around the photosensitive unit, the light intensity values of the light of the other colors that are in the incident light and filtered out by the light-filtering unit corresponding to the photosensitive unit, so that light intensity values of red, blue, and green corresponding to the photosensitive unit are determined, to generate a color of a pixel corresponding to the photosensitive unit. After determining colors of all pixels, the on-board control apparatus generates, based on the color of each pixel, the image shot by the camera.

Figures 5, 6:
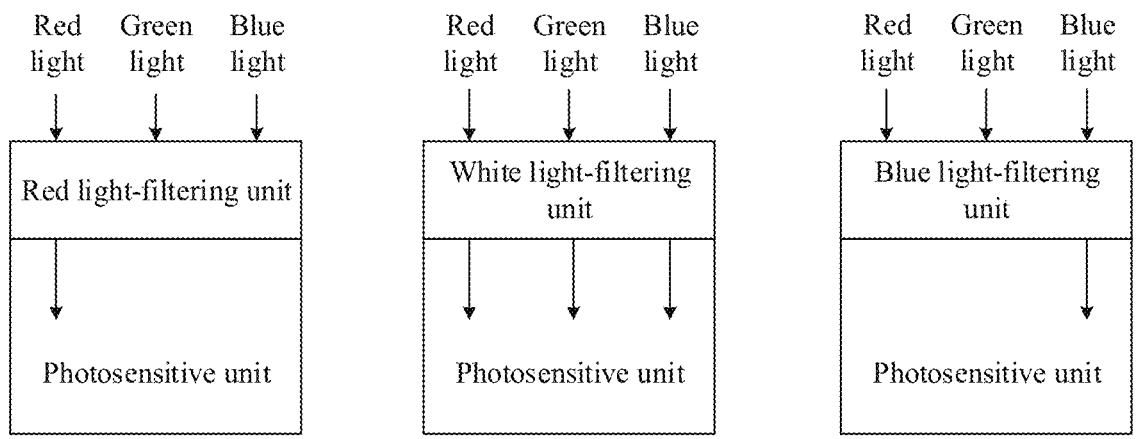
FIG. 5 is a schematic diagram of a light-filtering unit according to an embodiment of this application.
FIG. 6 is a schematic diagram of distribution of light of each color received by an on-board control apparatus according to an embodiment of this application.

In the light-filtering layer and the photosensitive layer shown in FIG. 4, every four light-filtering units at the light-filtering layer form one color unit, and each color unit is arranged in an RCCB manner. Correspondingly, when the incident light is irradiated onto light-filtering units of different colors, photosensitive units corresponding to the light-filtering units of different colors may sense light intensity values of the different colors. For example, in FIG. 5, when incident light is irradiated onto a red light-filtering unit, a photosensitive unit senses a light intensity value of red light in the incident light. When incident light is irradiated onto a white light-filtering unit, a photosensitive unit senses a light intensity value of the incident light. When incident light is irradiated onto a blue light-filtering unit, a photosensitive unit senses a light intensity value of blue light in the incident light. Colors of light intensity values sent by photosensitive units and received by the on-board control apparatus may be shown in FIG. 6. Each box corresponds to one pixel in the image. The on-board control apparatus determines, based on the light intensity value of each single color in FIG. 6, light intensity values of other colors of pixels corresponding to the single color, and then determines a color of each pixel.

Because each photosensitive unit has its unique optical sensitivity, when two photosensitive units sense light of a same light intensity value, the determined light intensity value may be different. A difference (which may also be referred to as a light intensity offset value) between the light intensity values determined by the two photosensitive units may be considered as a fingerprint of the camera, to authenticate an identity of the camera.

It is considered that, in actual application, a photosensitive unit corresponds to a light-filtering unit. Specifically, a light intensity offset value may be determined for photosensitive units corresponding to a light-filtering unit of a same color. Two photosensitive units that both correspond to the red light-filtering unit are used as an example for description. If incident light of the red light-filtering unit corresponding to the two photosensitive units is light of a same light intensity value, a difference between light intensity values of red light sensed by the two photosensitive units may be calculated and used as a fingerprint of the camera. Two photosensitive units that both correspond to the white light-filtering unit are used as another example for description. If incident light of the white light-filtering unit corresponding to the two photosensitive units is light of a same light intensity value, a difference between light intensity values of white light sensed by the two photosensitive units may be calculated and used as a fingerprint of the camera.

It should be noted that this embodiment of this application is implemented based on an assumption that incident light corresponding to a plurality of adjacent photosensitive units is the same (that is, incident light of light-filtering units corresponding to the plurality of adjacent photosensitive units is the same). Under this assumption, a difference between light intensity values of the plurality of adjacent photosensitive units may be used as the fingerprint of the camera.

In this embodiment of this application, the on-board control apparatus determines a light intensity offset value of a photosensitive unit in a preset camera. The preset camera is understood as an original camera of an autonomous vehicle, or an intermediate camera that passes validity verification of a manufacturer. The on-board control apparatus stores the determined light intensity offset value of the photosensitive unit in the preset camera. When the on-board control apparatus performs identity authentication on a to-be-authenticated camera, a light intensity offset value of the to-be-authenticated camera may be determined, and then the light intensity offset value of the to-be-authenticated camera is compared with the pre-stored light intensity offset value, so as to perform the identity authentication on the to-be-authenticated camera. The light intensity offset value of the photosensitive unit in the preset camera may be understood as a preset fingerprint of the preset camera, and the light intensity offset value of the to-be-authenticated camera may be understood as a to-be-authenticated fingerprint of the to-be-authenticated camera. During authentication, it may be determined whether the to-be-authenticated fingerprint matches the preset fingerprint. If it is determined that the to-be-authenticated fingerprint matches the preset fingerprint, it is determined that the to-be-authenticated camera is the preset camera. That is, the to-be-authenticated camera is an authorized camera. If it is determined that the to-be-authenticated fingerprint does not match the preset fingerprint, it is determined that the to-be-authenticated camera is not the preset camera. That is, the to-be-authenticated camera is an unauthorized camera.

The following provides descriptions by using an example in which the on-board control apparatus obtains a first image shot by the to-be-authenticated camera and obtains a second image shot by the preset camera.

When extracting the preset fingerprint from the preset camera, the on-board control apparatus specifically determines a preset light intensity offset value based on the second image shot by the preset camera. In a first implementation, the on-board control apparatus obtains the second image shot by the preset camera, and determines a preset light intensity offset value of each photosensitive unit in a photosensitive layer of the preset camera based on the second image shot by the preset camera, so that one or more preset light intensity offset values of M photosensitive units are obtained, and the preset light intensity offset values of the M photosensitive units are used to form the preset fingerprint of the preset camera. In a second implementation, the on-board control apparatus obtains the second image shot by the preset camera, determines one or more preset light intensity offset values of N photosensitive units in a photosensitive layer of the preset camera based on the second image shot by the preset camera, and forms the preset fingerprint of the preset camera by using the preset light intensity offset values of the N photosensitive units, where $N \leq M$.

For the second implementation, the on-board control apparatus may determine the preset light intensity offset values of the N photosensitive units according to a preset rule. There may be a plurality of preset rules. The preset rule may be determining the light intensity offset values of the N photosensitive units in a preset position in the photosensitive layer of the preset camera, or may be determining N light intensity offset values in a preset position in a sequence of all light intensity offset values in the photosensitive layer of the preset camera.

In the first preset rule, specifically, the N photosensitive units in the preset position in the photosensitive layer may be preset as a preset photosensitive unit, so as to determine the light intensity offset value corresponding to the preset photosensitive unit as the preset light intensity offset value. When the N preset light intensity offset values are determined, the N preset photosensitive units in the preset position in the photosensitive layer are first determined, and then the light intensity offset value of each preset photosensitive unit in the N preset photosensitive units is determined.

In the second preset rule, specifically, the light intensity offset value that is located in the preset position and that is in the sequence of the light intensity offset values of the M photosensitive units may be determined as the preset light intensity offset value. When the N preset light intensity offset values are determined, the light intensity offset values of the M photosensitive units in the photosensitive layer are determined based on the second image shot by the preset camera, and then N light intensity offset values located in the preset positions in the light intensity offset values of the M photosensitive units sorted in descending order may be used as the N preset light intensity offset values. With reference to FIG. 4, for example, there are 36 photosensitive units in the photosensitive layer. A light intensity offset value of each photosensitive unit is determined based on the second image shot by the preset camera, and then 18 light intensity offset values in even positions are determined, in descending order of light intensity offset values of the 36 photosensitive units, as 18 preset light intensity offset values. In an optional implementation, N largest light intensity offset values in the light intensity offset values of the M photosensitive units may be determined as the N preset light intensity offset values.

In this embodiment of this application, when extracting the preset fingerprint from the preset camera, the on-board control apparatus may extract the preset fingerprint from any frame of the second image shot by the preset camera, or may extract the preset fingerprint from a plurality of frames of the second image shot by the preset camera. When performing the extraction from the plurality of frames of the second image shot by the preset camera, the on-board control apparatus may determine, for each frame of the second image, a light intensity offset value of a photosensitive unit in the frame of the second image, and then an average value of light intensity offset values of the photosensitive unit in all the frames of the second image is used as a light intensity offset value of the photosensitive unit. The photosensitive unit herein may be any one of the N preset photosensitive units in a first preset rule, or may be any one of the M photosensitive units in a second preset rule.

That any photosensitive unit for which a light intensity offset value needs to be determined may be determined by the on-board control apparatus based on a light intensity value of the photosensitive unit in any frame of the second image and a light intensity value of an adjacent photosensitive unit of the photosensitive unit. Considering light color sensed by a photosensitive unit, a photosensitive unit that corresponds to the same color with the photosensitive unit and that is located around the photosensitive unit may be determined and used as the adjacent photosensitive unit of the photosensitive unit. In an implementation, it may be set that the adjacent photosensitive unit of the photosensitive unit and the photosensitive unit correspond to a same color and have a preset distance corresponding to the color. In other words, if a surrounding unit of the photosensitive unit meets a condition, the surrounding unit is determined as the adjacent photosensitive unit of the photosensitive unit. The condition includes: The surrounding unit corresponds to the same color with the photosensitive unit, and has the preset distance, corresponding to the color, from the photosensitive unit.

In an implementation, one adjacent photosensitive unit of a photosensitive unit may be determined from a photosensitive layer, and a difference between a light intensity value of the photosensitive unit and a light intensity value of the adjacent photosensitive unit is used as a light intensity offset value of the photosensitive unit. The adjacent photosensitive unit of the photosensitive unit may be any photosensitive unit that meets the foregoing condition and that is around the photosensitive unit. For example, in FIG. 4, coordinates of a photosensitive unit are (x, y). If the photosensitive unit corresponds to red, there may be four photosensitive units that correspond to red and that have a preset distance 2 from the photosensitive unit in a horizontal direction or a vertical direction, coordinates of the four photosensitive units are respectively (x+2, y), (x, y+2), (x−2, y), and (x, y−2), and a difference may be obtained between a light intensity value of any one of the four photosensitive units and the light intensity value of the photosensitive unit.

In another implementation, a plurality of adjacent photosensitive units of a photosensitive unit may be determined from a photosensitive layer, and then an average value, that is, an average value of light intensity values, of the plurality of adjacent photosensitive units is determined. A difference between a light intensity value of the photosensitive unit and the average value of the light intensity values of the plurality of adjacent photosensitive units is used as a light intensity offset value of the photosensitive unit, where each of the plurality of adjacent photosensitive units is a photosensitive units that is around the photosensitive unit, that has a same color with the photosensitive unit, and that has a preset distance, corresponding to the color, from the photosensitive unit. For example, coordinates of a photosensitive unit in FIG. 4 are (x, y). If the photosensitive unit corresponds to red, there may be four adjacent photosensitive units of the photosensitive unit, and coordinates of the four adjacent photosensitive units are respectively (x+2, y), (x, y+2), (x−2, y), and (x, y−2). An average value of light intensity values of the four adjacent photosensitive units is determined, and then a difference is obtained between the light intensity value of the photosensitive unit and the average value.

In this example, it may be set that when the photosensitive unit corresponds to blue or red, a preset distance between the photosensitive unit and the adjacent photosensitive unit of the photosensitive unit in a horizontal direction or a vertical direction is 2, and when the photosensitive unit corresponds to white, preset distances between the photosensitive unit and the adjacent photosensitive unit of the photosensitive unit in a horizontal direction and a vertical direction are both 1. Certainly, preset distances corresponding to different colors may alternatively be other values, and specifically may be determined based on experience or a requirement. In addition, preset distances corresponding to photosensitive units of different colors may be the same or different. In addition, it may be set that there are four adjacent photosensitive units of the photosensitive unit, but another quantity of adjacent photosensitive units of the photosensitive unit may be set, for example, 2, 8, or another quantity, and quantities of adjacent photosensitive units of different colors may be the same or different.

In another example, when it is set that a photosensitive unit corresponds to blue, a preset distance between the photosensitive unit and an adjacent photosensitive unit of the photosensitive unit in a horizontal direction or a vertical direction is 4, and there are four adjacent photosensitive units. When it is set that a photosensitive unit corresponds to red, a preset distance between the photosensitive unit and an adjacent photosensitive unit of the photosensitive unit in a horizontal direction or a vertical direction is 2, and there are four adjacent photosensitive units. When it is set that a photosensitive unit corresponds to white, preset distances between the photosensitive unit and an adjacent photosensitive unit of the photosensitive unit in a horizontal direction and in a vertical direction are both 1, and therefore there are four adjacent photosensitive units.

After determining the light intensity value of the photosensitive unit in any frame of the second image and the light intensity values of the plurality of adjacent photosensitive units of the photosensitive unit, the on-board control apparatus may determine an average light intensity value of the light intensity values of the plurality of adjacent photosensitive units, and then use a difference between the light intensity value of the photosensitive unit and the average light intensity value as the light intensity offset value of the photosensitive unit in the frame of the second image. Certainly, a largest or smallest light intensity value in the light intensity values of the plurality of adjacent photosensitive units may also be determined, and a difference between the light intensity value of the photosensitive unit and the determined largest or smallest light intensity value is used as the light intensity offset value of the photosensitive unit in the frame of the second image. The largest light intensity value and the smallest light intensity value in the light intensity values of the plurality of adjacent photosensitive units is determined, an average value of the largest light intensity value and the smallest light intensity value is determined, and then a difference between the light intensity value of the photosensitive unit and the average value of the largest light intensity value and the smallest light intensity value is used as the light intensity offset value of the photosensitive in the frame of the second image. The difference herein may be an absolute value of the difference, or may not be an absolute value of the difference.

Figure 7:
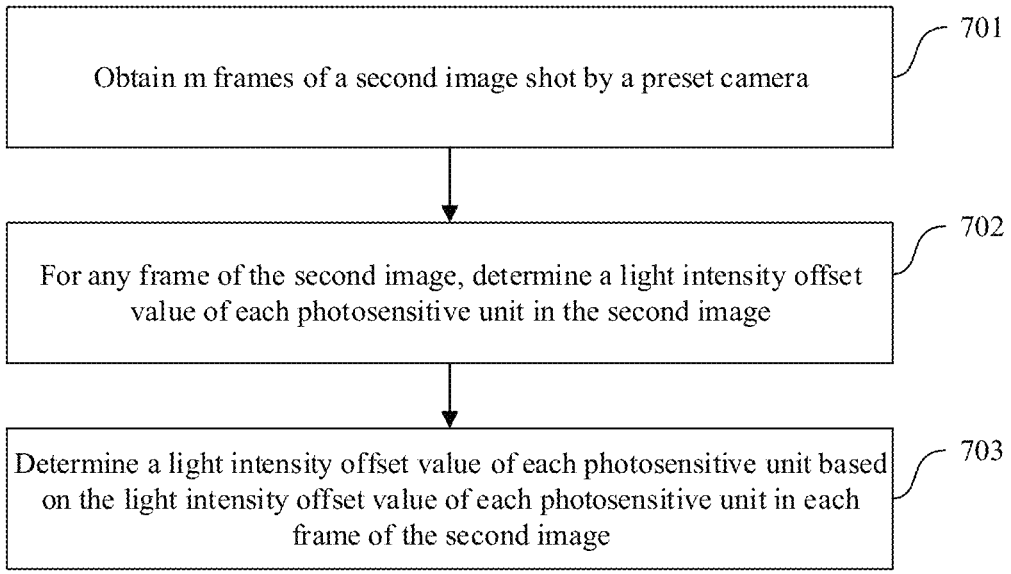
FIG. 7 is a schematic flowchart of determining a preset fingerprint according to an embodiment of this application.

To better explain an implementation process of determining a preset fingerprint by a preset camera in this embodiment of this application, with reference to FIG. 4, the following provides a preset fingerprint extraction procedure shown in FIG. 7. The procedure is completed by an on-board control apparatus.

Block 701. Obtain m frames of a second image shot by a preset camera, where m is greater than or equal to 1.

Block 702. For any frame of the second image, determine a light intensity offset value of each photosensitive unit in the second image.

Using an $i^{th}$ frame of the second image as an example, descriptions for cases in which the photosensitive unit respectively corresponds to white, red, and blue are as follows:

If the photosensitive unit corresponds to white, a light intensity value of the photosensitive unit in the $i^{th}$ frame of the second image is set to P(x, y), and light intensity values of adjacent photosensitive units of the photosensitive unit in the $i^{th}$ frame of the second image are respectively P(x+1, y+1), P(x−1, y−1), P(x+1, y−1), and P(x−1, y+1), the light intensity offset value of the photosensitive unit in the $i^{th}$ frame of the second image may be calculated according to the formula (1).

$$\text{bias}_i(P(x, y))=P(x, y)-(P(x+1, y+1)+P(x-1, y-1)+P(x+1, y-1)+P(x-1, y+1))/4 \quad (1)$$

If the photosensitive unit corresponds to red, a light intensity value of the photosensitive unit in the $i^{th}$ frame of the second image is set to P(x, y), and light intensity values of adjacent photosensitive units of the photosensitive unit in the $i^{th}$ frame of the second image are respectively P(x−2, y), P(x, y−2), P(x, y+2), and P(x+2, y), the light intensity offset value of the photosensitive unit in the $i^{th}$ frame of the second image may be calculated according to the formula (2).

$$\text{bias}_i(P(x, y))=P(x, y)-(P(x-2, y)+P(x, y-2)+P(x, y+2)+P(x+2, y))/4 \quad (2)$$

If the photosensitive unit corresponds to blue, a light intensity value of the photosensitive unit in the $i^{th}$ frame of the second image is set to P(x,y), and light intensity values of adjacent photosensitive units of the photosensitive unit in the $i^{th}$ frame of the second image are respectively P(x−2, y), P(x, y−2), P(x, y+2), and P(x+2, y), the light intensity offset value of the photosensitive unit in the $i^{th}$ frame of the second image may be calculated according to the formula (3).

$$\text{bias}_i(P(x, y))=P(x, y)-(P(x-2, y)+P(x, y-2)+P(x, y+2)+P(x+2, y))/4 \quad (3)$$

Block 703. Determine a light intensity offset value of each photosensitive unit based on the light intensity offset value of each photosensitive unit in each frame of the second image.

After the light intensity offset value of each photosensitive unit in each frame of the second image is determined, the light intensity offset value of each photosensitive unit in m frames of the second image is obtained, and then the light intensity offset value of each photosensitive unit is determined according to the formula (4).

$$\text{bias}(P(x, y)) = \sum_{i=0}^{m} \text{bias}_i(P(x, y))/m \quad (4)$$

bias(P(x, y)) is a light intensity offset value of a photosensitive unit in the preset camera, and $\text{bias}_i$(P(x, y)) is the light intensity offset value of the photosensitive unit in the $i^{th}$ frame of the second image.

In addition, a sum of light intensity offset values of each photosensitive unit in the m frames of the second image may also be used as the light intensity offset value of each photosensitive unit. That is, the light intensity offset value of each photosensitive unit is determined according to the formula (5).

$$\text{bias}(P(x, y)) = \sum_{i=0}^{m} \text{bias}_i(P(x, y)) \quad (5)$$

In this embodiment of this application, considering that when a light intensity offset value of a photosensitive unit is calculated, a light intensity value of an adjacent photosensitive unit of the photosensitive unit needs to be obtained, some photosensitive units may be located at an edge of the photosensitive layer of the preset camera, and consequently light intensity offset values of the photosensitive units cannot be calculated in a relatively accurate manner. Therefore, the photosensitive units located at the edge of the photosensitive layer may be removed. Using FIG. 4 as an example, photosensitive units corresponding to red and blue in the top two rows, the bottom two rows, the leftmost two columns, and the rightmost two columns of the photosensitive layer, and photosensitive units corresponding to white in the top row, the bottom row, the leftmost column, and the rightmost column of the photosensitive layer may be removed.

The foregoing has described in detail an implementation in which the on-board control apparatus determines N preset light intensity offset values based on the second image shot by the preset camera. The N preset light intensity offset values may be sequentially stored in the on-board control apparatus and used as the preset fingerprint of the preset camera. In other words, the on-board control apparatus stores N preset values, where the N preset values are used to authenticate an identity of a to-be-authenticated camera, and the N preset values may be stored in a preset N-dimensional vector manner. Herein, because a hardware security module is disposed in the on-board control apparatus, the N preset values may be stored in the hardware security module, to ensure storage security.

Figure 8:
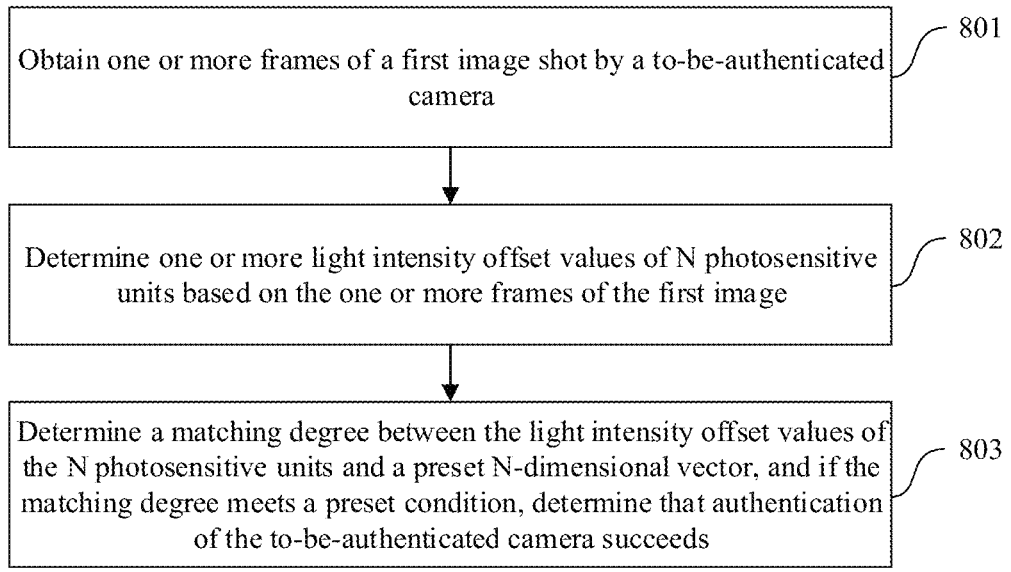
FIG. 8 is a schematic flowchart of authentication of a camera according to an embodiment of this application.

When performing identity authentication on a to-be-authenticated camera, an on-board control apparatus may refer to a flowchart of performing identity authentication on the to-be-authenticated camera shown in FIG. 8. The procedure may be implemented by the on-board control apparatus, and is specifically as follows:

Block 801. Obtain one or more frames of a first image shot by the to-be-authenticated camera.

Block 802. Determine one or more light intensity offset values of N photosensitive units based on the one or more frames of the first image.

When the on-board control apparatus extracts a preset fingerprint from a preset camera, no matter whether one or more light intensity offset values of M photosensitive units are determined as the preset fingerprint or the light intensity offset values of the N photosensitive units are determined as the preset fingerprint, correspondingly, when extracting a to-be-authenticated fingerprint from the to-be-authenticated camera, the on-board control apparatus also needs to extract the to-be-authenticated fingerprint in a same manner.

In a first implementation, when determining the preset fingerprint, the on-board control apparatus may determine a light intensity offset value of each photosensitive unit in a photosensitive layer of the preset camera based on a second image shot by the preset camera, and form the preset fingerprint of the preset camera by using the light intensity offset values of the M photosensitive units in the photosensitive layer of the preset camera. Correspondingly, when determining the to-be-authenticated fingerprint, the on-board control apparatus may determine the light intensity offset value of each photosensitive unit in the photosensitive layer of the to-be-authenticated camera based on the first image shot by the to-be-authenticated camera, and form the to-be-authenticated fingerprint of the to-be-authenticated camera by using the light intensity offset values of the M photosensitive units in the photosensitive layer of the to-be-authenticated camera.

In addition, this application provides an implementation of short fingerprint extraction, to reduce storage space used to store the preset fingerprint and reduce a calculation amount in the identity authentication. In other words, in a second implementation, when determining a preset fingerprint, the on-board control apparatus determines, according to a preset rule and the second image shot by the preset camera, N preset light intensity offset values to form the preset fingerprint. Correspondingly, when determining the to-be-authenticated fingerprint, the on-board control apparatus determines, based on a same preset rule and the first image shot by the to-be-authenticated camera, N light intensity offset values to form the to-be-authenticated fingerprint.

In the second implementation, N largest light intensity offset values in the light intensity offset values of the M photosensitive units in the photosensitive layer of the preset camera may be determined as the N preset light intensity offset values, and the N preset light intensity offset values are used as the preset fingerprint. The N largest light intensity offset values in the light intensity offset values of the M photosensitive units in the photosensitive layer of the to-be-authenticated camera may be determined as the to-be-authenticated fingerprint. For example, M light intensity offset values in the preset camera are determined, and N largest light intensity offset values determined from the M light intensity offset values are respectively $bias_0(P(x_1, y_1))$, $bias_0(P(x_2, y_2))$, ..., and $bias_0(P(x_N, y_N))$, which are used as the preset fingerprint. M light intensity offset values in the to-be-authenticated camera are determined, and N largest light intensity offset values determined from the M light intensity offset values are respectively $bias(P(x_1, y_1))$, $bias(P(x_2, y_2))$, ..., and $bias(P(x_N, y_N))$, which are used as the to-be-authenticated fingerprint.

Herein, the N largest light intensity offset values are determined from the light intensity offset values of the M photosensitive units when both the preset fingerprint and the to-be-authenticated fingerprint are determined, but if the to-be-authenticated camera and the preset camera are a same camera, positions of N photosensitive units corresponding to the N preset light intensity offset values in the preset fingerprint are the same as positions of N photosensitive units corresponding to the N light intensity offset values in the to-be-authenticated fingerprint; or if the to-be-authenticated camera and the preset camera are not a same camera, positions of N photosensitive units corresponding to the N preset light intensity offset values in the preset fingerprint are different from positions of N photosensitive units corresponding to the N light intensity offset values in the to-be-authenticated fingerprint. In this way, accuracy of identity authentication is further improved.

In the second implementation, the light intensity offset values of the N photosensitive units in the preset position in the photosensitive layer of the preset camera may be determined as the N preset light intensity offset values, and the N preset light intensity offset values are used as the preset fingerprint. The N light intensity offset values of the N photosensitive units in the same position in the photosensitive layer of the to-be-authenticated camera may be determined as the to-be-authenticated fingerprint.

For example, light intensity offset values of N photosensitive units at $(x_1, y_1)$, $(x_2, y_2)$, ..., and $(x_N, y_N)$ in the photosensitive layer of the preset camera are determined as the N preset light intensity offset values, and the N preset light intensity offset values are respectively $bias_0(P(x_1, y_1))$, $bias_0(P(x_2, y_2))$, ..., and $bias_0(P(x_N, y_N))$, which are used as the preset fingerprint. N light intensity offset values of the N photosensitive units at $(x_1, y_1)$, $(x_2, y_2)$, ..., and $(x_N, y_N)$ in the photosensitive layer of the to-be-authenticated camera are determined and are respectively $bias(P(x_1, y_1))$, $bias(P(x_2, y_2))$, ..., and $bias(P(x_N, y_N))$, which are used as the to-be-authenticated fingerprint. In this manner, the on-board control apparatus does not need to determine light intensity offset values of all photosensitive units in the photosensitive layer of the preset camera, and each time the identity authentication is performed on the to-be-authenticated camera, the on-board control apparatus does not need to determine light intensity offset values of all photosensitive units in the photosensitive layer of the to-be-authenticated camera, thereby reducing the calculation amount.

In the second implementation, the N largest light intensity offset values in the light intensity offset values of all the photosensitive units in the photosensitive layer of the preset camera may be further determined as the N preset light intensity offset values, and the N preset light intensity offset values are used as the preset fingerprint. At the same time, positions of the N preset light intensity offset values in the photosensitive layer of the preset camera are determined, and when the identity authentication is performed on the to-be-authenticated camera, the N light intensity offset values of the photosensitive layer of the to-be-authenticated camera are determined based on the foregoing positions. For example, M light intensity offset values in the preset camera are determined, and N largest light intensity offset values determined from the M light intensity offset values are respectively $bias_0(P(x_1, y_1))$, $bias_0(P(x_2, y_2))$, ..., and $bias_0(P(x_N, y_N))$, which are used as the preset fingerprint. N positions corresponding to the N largest light intensity offset values are $(x_1, y_1)$, $(x_2, y_2)$, ..., and $(x_N, y_N)$. Therefore, when the identity authentication is performed on the to-be-authenticated camera, the N light intensity offset values of the N photosensitive units at $(x_1, y_1)$, $(x_2, y_2)$, ..., and $(x_N, y_N)$ may be directly determined as the to-be-authenticated fingerprint. In this manner, each time the on-board control apparatus performs the identity authentication on the to-be-authenticated camera, the on-board control apparatus does not need to determine light intensity offset values of all photosensitive units in the to-be-authenticated camera, thereby reducing the calculation amount.

In this embodiment of this application, the storage space occupied by the preset fingerprint can be greatly reduced. A camera with a resolution of 1208×1928 corresponds to 2329024 photosensitive units (1208×1928=2329024). If each color unit is arranged in an RCCB manner, the top two rows, the bottom two rows, the leftmost two columns, and the rightmost two columns are removed, and 2316496 photosensitive units (1204×1924=2316496) remain. If 2316496 light intensity offset values of the camera are determined, a preset vector with a length of 2316496 is formed. However, if 100 light intensity offset values are determined from the 2316496 light intensity offset values, a preset vector with a length of 100 is formed. The preset vector with the length of 100 occupies much less storage space than the preset vector with the length of 2316496.

In this embodiment of this application, 100 preset light intensity offset values may be determined as the preset fingerprint, or 50 preset light intensity offset values may be determined as the preset fingerprint. Certainly, another quantity of preset light intensity offset values may be used as the preset fingerprint. Correspondingly, a same quantity of light intensity offset values are determined, from the first image shot by the to-be-authenticated camera, as the to-be-authenticated fingerprint. A value of N may be determined based on experience or an actual requirement, and is not limited herein.

Block 803. Determine a matching degree between the light intensity offset values of the N photosensitive units and a preset N-dimensional vector; and if the matching degree meets a preset condition, determine that authentication of the to-be-authenticated camera succeeds.

After determining the to-be-authenticated fingerprint, the on-board control apparatus matches the to-be-authenticated fingerprint with the preset fingerprint to obtain a matching degree between the to-be-authenticated fingerprint and the preset fingerprint. If the matching degree meets a preset condition, it is determined that the authentication of the to-be-authenticated camera succeeds; or if the matching degree does not meet a preset condition, it is determined that the authentication of the to-be-authenticated camera fails.

Specifically, a similarity between a first vector including N light intensity offset values of the to-be-authenticated camera and a preset N-dimensional vector may be determined. If the similarity is greater than a similarity threshold, it is determined that the authentication of the to-be-authenticated camera succeeds; or if the similarity is not greater than a similarity threshold, it is determined that the authentication of the to-be-authenticated camera fails.

Herein, when the N light intensity offset values of the to-be-authenticated camera form the first vector, the N light intensity offset values may form the first vector in a preset sequence.

In an implementation 1, the first vector may be formed by N light intensity offset values based on positions of corresponding N photosensitive units in the photosensitive layer of the to-be-authenticated camera. For example, for an $X^{th}$ row of the photosensitive layer of the to-be-authenticated camera, photosensitive units located in the $X^{th}$ row of the N photosensitive units are determined, and a sorting result of light intensity offset values corresponding to the photosensitive units are determined in a left-to-right sequence of the determined photosensitive units, where X is greater than or equal to 1. The sorting result of the light intensity offset values corresponding to an $(X+1)^{th}$ row, an $(X+2)^{th}$ row, ..., and an $(X+n)^{th}$ row is determined based on the operation of determining the sorting result of the light intensity offset values corresponding to the $X^{th}$ row, until sorting of the N light intensity offset values is completed. A sorting result of light intensity offset values corresponding to each row is concatenated in a sequence of the $X^{th}$ row, the $(X+1)^{th}$ row, the $(X+2)^{th}$ row, ..., and the $(X+n)^{th}$ row, to obtain the first vector.

FIG. 9 is a schematic diagram of determining position distribution of N photosensitive units in a photosensitive layer of a to-be-authenticated camera according to an embodiment of this application, where N=7. The 7 photosensitive units are respectively a photosensitive unit 1 to a photosensitive unit 7. Light intensity offset values corresponding to the photosensitive unit 1 to the photosensitive unit 7 are bias 1 to bias 7 respectively. For the second row in a photosensitive layer of the to-be-authenticated camera, it is determined that a sorting result of light intensity offset values corresponding to the second row is bias 1 and bias 2. For the fourth row in the photosensitive layer of the to-be-authenticated camera, it is determined that a sorting result of light intensity offset values corresponding to the fourth row is bias 7, bias 4, and bias 6. For the fifth row in the photosensitive layer of the to-be-authenticated camera, it is determined that a sorting result of light intensity offset values corresponding to the fifth row is bias 3 and bias 5. Then, a sorting result of light intensity offset values corresponding to each row is concatenated in a top-to-bottom sequence, to obtain a first vector (bias 1, bias 2, bias 7, bias 4, bias 6, bias 3, and bias 5).

It should be noted that, in the implementation 1, the sorting result of the light intensity offset values corresponding to each row is first determined, and then the sorting result of the light intensity offset values corresponding to each row is concatenated in the top-to-bottom sequence, to obtain the first vector. However, alternatively, a sorting result of light intensity offset values corresponding to each column may be first determined, and then a sorting result of light intensity offset values corresponding to each column is concatenated in a left-to-right sequence, to obtain the first vector.

In an implementation 2, the first vector may be formed by the N light intensity offset values in a magnitude sequence. For example, light intensity offset values of the N photosensitive units are sorted in descending order and then used as the first vector. Still taking FIG. 9 as an example, if the light intensity offset values of the 7 photosensitive units are bias 1, bias 5, bias 7, bias 3, bias 6, bias 4, and bias 2 in descending order, the obtained first vector is (bias 1, bias 5, bias 7, bias 3, bias 6, bias 4, and bias 2).

A similarity between the first vector and a preset N-dimensional vector may be determined by calculating a cosine similarity (Cosine), a Euclidean distance (Euclidean Distance), a Manhattan distance (Manhattan Distance), or the like.

For example, when a cosine similarity between the first vector and the preset N-dimensional vector is calculated, the first vector is set to $A=[a_1, a_2, a_3, \ldots]$, where $a_1=\text{bias}(P(x_1, y_1))$, $a_2=\text{bias}(P(x_2, y_2))$, ..., and $a_N=\text{bias}(P(x_N, y_N))$; and the preset N-dimensional vector is set to $B=[b_1, b_2, b_3, \ldots]$, where $b_1=bias_0(P(x_1, y_1))$, $b_2=bias_0(P(x_2, y_2))$, ..., and $b_N=bias_N(P(x_N, y_N))$. The cosine similarity between the first vector and the preset N-dimensional vector is calculated according to the formula (6).

$$\frac{A \cdot B}{\|A\|\|B\|} = \frac{\sum_{i=1}^{N} a_i b_i}{\sqrt{\sum_{i=1}^{N} a_i^2} \sqrt{\sum_{i=1}^{N} b_i^2}} \quad (6)$$

If the cosine similarity between the first vector and the preset N-dimensional vector is greater than a similarity threshold, it is determined that the N light intensity offset values match the preset N light intensity offset values and authentication of the to-be-authenticated camera succeeds. If the cosine similarity between the first vector and the preset N-dimensional vector is not greater than a similarity threshold, it is determined that the N light intensity offset values do not match the preset N light intensity offset values and authentication of the to-be-authenticated camera fails.

When the on-board control apparatus determines that the authentication of the to-be-authenticated camera succeeds and the to-be-authenticated camera is an authorized camera, the on-board control apparatus may receive a video or an image shot by the authorized camera, and further make a driving decision based on the video or the image shot by the authorized camera. When the on-board control apparatus determines that the authentication of the to-be-authenticated camera fails and the to-be-authenticated camera is an unauthorized camera, the on-board control apparatus may take a corresponding control measure, for example, refusing communication, or refusing to receive a video or an image shot by the unauthorized camera, thereby avoiding malicious spoofing of the unauthorized camera.

Figure 10:
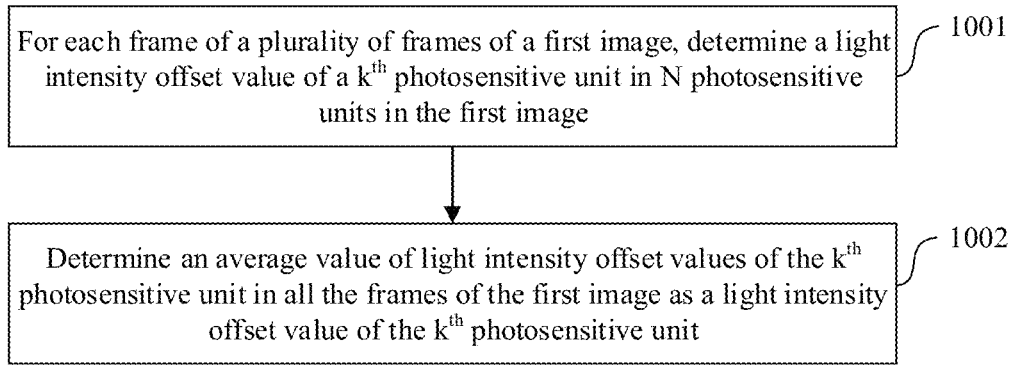
FIG. 10 is a schematic flowchart of determining a light intensity offset value according to an embodiment of this application.

In an embodiment of this application, an on-board control apparatus may determine one or more light intensity offset values of N photosensitive units based on one or more frames of a first image. A procedure is shown in FIG. 10.

Block 1001. For each frame of a plurality of frames of the first image, determine a light intensity offset value of the $k^{th}$ photosensitive unit in the N photosensitive units in the first image.

When the light intensity offset value of the $k^{th}$ photosensitive unit in the first image is determined, the light intensity offset value may be determined based on a light intensity value of the $k^{th}$ photosensitive unit in the first image and a light intensity value of one or more adjacent photosensitive units of the $k^{th}$ photosensitive unit in the first image.

In an optional implementation, a difference between the light intensity value of the $k^{th}$ photosensitive unit in the first image and a light intensity value of one adjacent photosensitive unit in the first image is determined as the light intensity offset value of the $k^{th}$ photosensitive unit in the first image, where the adjacent photosensitive unit and the $k^{th}$ photosensitive unit correspond to a same color and have a preset distance corresponding to the color.

In another optional implementation, an average light intensity value of light intensity values of a plurality of adjacent photosensitive units in the first image is determined, and a difference between the light intensity value of the $k^{th}$ photosensitive unit in the first image and the average light intensity value is determined as the light intensity offset value of the $k^{th}$ photosensitive unit in the first image, where each of the plurality of adjacent photosensitive units and the $k^{th}$ photosensitive unit correspond to a same color and have a preset distance corresponding to the color.

For details of the implementation of determining the light intensity offset value of the photosensitive unit in the first image, refer to the implementations of determining the light intensity offset value of the photosensitive unit in the second image.

Block 1002. Determine an average value of light intensity offset values of the $k^{th}$ photosensitive unit in all the frames of the first image as a light intensity offset value of the $k^{th}$ photosensitive unit.

Figure 11:
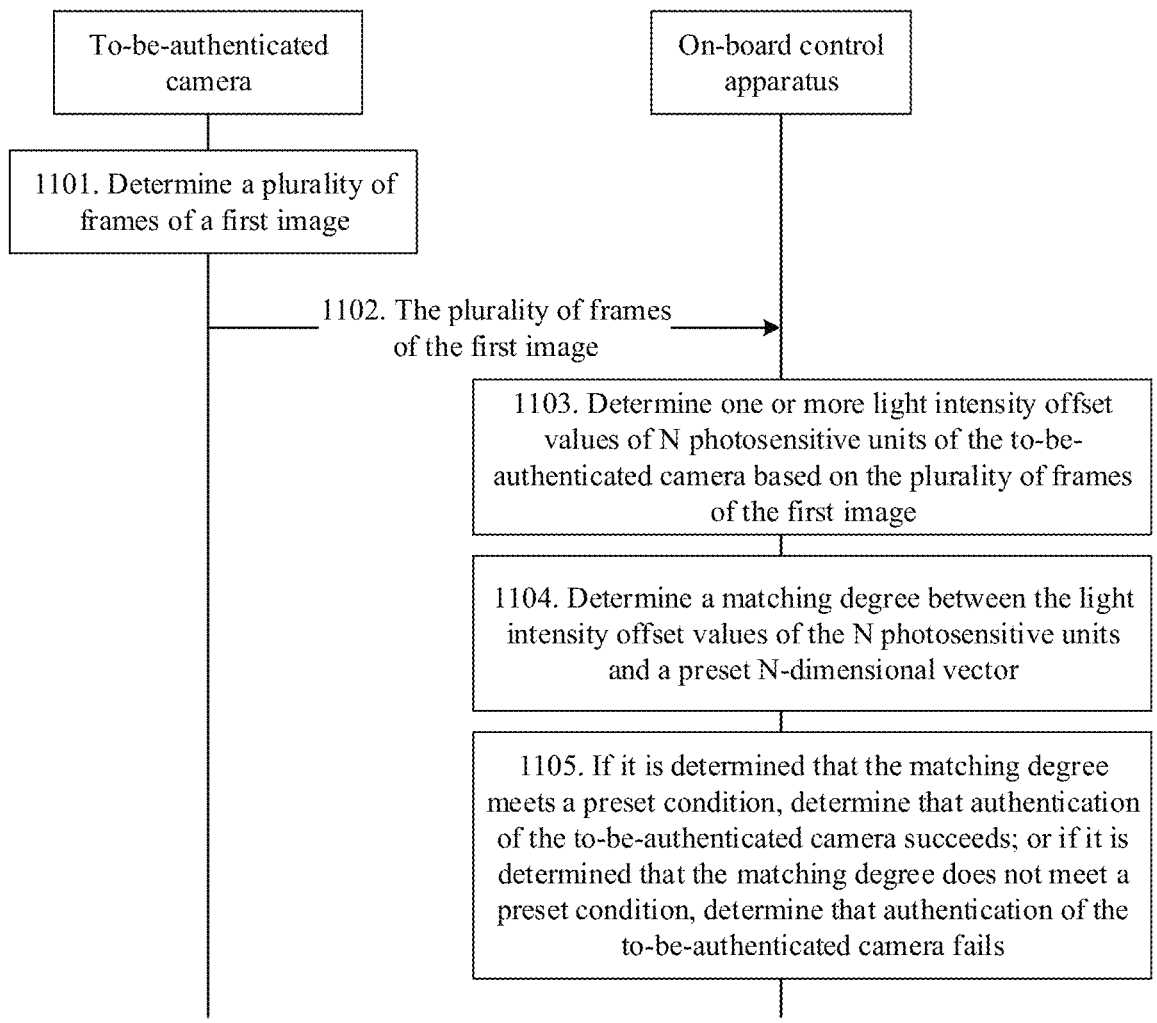
FIG. 11 is a schematic flowchart of authentication of another camera according to an embodiment of this application.

FIG. 11 is a flowchart of interaction between an on-board control apparatus and a to-be-authenticated camera according to an embodiment of this application. An implementation of a procedure of the interaction is described in detail in another embodiment, and details are not described again.

Block 1101. The to-be-authenticated camera determines a plurality of frames of a first image.

Block 1102. The to-be-authenticated camera sends the plurality of frames of the first image to an on-board control apparatus.

Block 1103. The on-board control apparatus determines one or more light intensity offset values of N photosensitive units of the to-be-authenticated camera based on the plurality of frames of the first image.

Block 1104. The on-board control apparatus determines a matching degree between the light intensity offset values of the N photosensitive units and a preset N-dimensional vector.

Block 1105. If the matching degree meets a preset condition, the on-board control apparatus determines that authentication of the to-be-authenticated camera succeeds; or if the matching degree does not meet a preset condition, the on-board control apparatus determines that authentication of the to-be-authenticated camera fails.

In this embodiment of this application, when the identity authentication is performed on the to-be-authenticated camera, a to-be-authenticated fingerprint of the to-be-authenticated camera may be stored, and the stored to-be-authenticated fingerprint is used as training data to perform model training, so as to update a preset fingerprint.

In an implementation, the to-be-authenticated camera may send a light intensity value of each photosensitive unit in a shot image to the on-board control apparatus, so that the on-board control apparatus determines a light intensity offset value of each photosensitive unit based on the light intensity value of each photosensitive unit, and uses the light intensity offset value as the to-be-authenticated fingerprint of the to-be-authenticated camera. In another implementation, the to-be-authenticated camera may send a shot image to the on-board control apparatus. The on-board control apparatus extracts the light intensity value of each photosensitive unit in the image, and further determines the light intensity offset value of each photosensitive unit as the to-be-authenticated fingerprint of the to-be-authenticated camera.

To better describe accuracy of performing authentication on the to-be-authenticated camera in a fingerprint matching manner in this embodiment of this application, the following experimental data may be further used for description.

In the first experiment, there are four cameras. Light intensity offset values of 10 photosensitive units are extracted, as fingerprints, from 50 frames of an image shot by each camera. For any two of the four cameras, a similarity between fingerprints of the two cameras is determined. An obtained result is shown in Table 1. When a fingerprint of the first camera is matched with a fingerprint of another camera, the similarity is 0, but when a fingerprint of the first camera is matched with a fingerprint of the first camera, the similarity is 0.641. When a fingerprint of the second camera is matched with a fingerprint of another camera, the similarity is 0, but when a fingerprint of the second camera is matched with a fingerprint of the second camera, the similarity is 0.643. When a fingerprint of the third camera is matched with a fingerprint of another camera, the similarity is 0, but when a fingerprint of the third camera is matched with a fingerprint of the third camera, the similarity is 0.592. When a fingerprint of the fourth camera is matched with the fingerprint of another camera, the similarity is 0, but when a fingerprint of the fourth camera is matched with a fingerprint of the fourth camera, the similarity is 0.635. It can be learned that a similarity between fingerprints of two same cameras is relatively large, and a similarity between fingerprints of two different cameras is 0 or approaches 0.

TABLE 1

|  | First camera | Second camera | Third camera | Fourth camera |
|---|---|---|---|---|
| First camera | 0.641 | 0.000 | 0.000 | 0.000 |
| Second camera | 0.000 | 0.643 | 0.000 | 0.000 |
| Third camera | 0.000 | 0.000 | 0.592 | 0.000 |
| Fourth camera | 0.000 | 0.000 | 0.000 | 0.635 |

In the second experiment, there are four cameras. Light intensity offset values of 10 photosensitive units are extracted, as fingerprints, from 250 to 500 frames of an image shot by each camera. For any two of the four cameras, a similarity between fingerprints of the two cameras is determined. An obtained result is shown in Table 2. When a fingerprint of the first camera is matched with a fingerprint of another camera, the similarity is 0, but when a fingerprint of the first camera is matched with a fingerprint of the first camera, the similarity is 0.970. When a fingerprint of the second camera is matched with a fingerprint of another camera, the similarity is 0, but when a fingerprint of the second camera is matched with a fingerprint of the second camera, the similarity is 0.946. When a fingerprint of the third camera is matched with a fingerprint of another camera, the similarity is 0, but when a fingerprint of the third camera is matched with a fingerprint of the third camera, the similarity is 0.964. When a fingerprint of the fourth camera is matched with a fingerprint of another camera, the similarity is 0, but when a fingerprint of the fourth camera is matched with a fingerprint of the fourth camera, the similarity is 0.954. It can be learned that a similarity between fingerprints of two same cameras is relatively large, and a similarity between fingerprints of two different cameras is 0 or approaches 0.

TABLE 2

|  | First camera | Second camera | Third camera | Fourth camera |
|---|---|---|---|---|
| First camera | 0.970 | 0.000 | 0.000 | 0.000 |
| Second camera | 0.000 | 0.946 | 0.000 | 0.000 |
| Third camera | 0.000 | 0.000 | 0.964 | 0.000 |
| Fourth camera | 0.000 | 0.000 | 0.000 | 0.954 |

In the third experiment, there are four cameras. Light intensity offset values of 100 photosensitive units are extracted, as fingerprints, from 50 frames of an image shot by each camera. For any two of the four cameras, a similarity between fingerprints of the two cameras is determined. An obtained result is shown in Table 3. When a fingerprint of the first camera is matched with a fingerprint of another camera, the similarity is 0 or approaches 0, but when a fingerprint of the first camera is matched with a fingerprint of the first camera, the similarity is 0.604. When a fingerprint of the second camera is matched with a fingerprint of another camera, the similarity is 0, but when a fingerprint of the second camera is matched with a fingerprint of the second camera, the similarity is 0.237. When a fingerprint of the third camera is matched with a fingerprint of another camera, the similarity is 0, but when a fingerprint of the third camera is matched with a fingerprint of the third camera, the similarity is 0.563. When a fingerprint of the fourth camera is matched with a fingerprint of another camera, the similarity is 0, but when a fingerprint of the fourth camera is matched with a fingerprint of the fourth camera, the similarity is 0.182. It can be learned that a similarity between fingerprints of two same cameras is relatively large, and a similarity between fingerprints of two different cameras is 0 or approaches 0.

TABLE 3

|  | First camera | Second camera | Third camera | Fourth camera |
|---|---|---|---|---|
| First camera | 0.604 | 0.000 | 0.000 | 0.000 |
| Second camera | 0.000 | 0.237 | 0.000 | 0.000 |
| Third camera | 0.05 | 0.000 | 0.563 | 0.000 |
| Fourth camera | 0.000 | 0.000 | 0.000 | 0.182 |

In this embodiment of this application, one or more frames of the first image shot by the to-be-authenticated camera are obtained. The light intensity offset values of the N photosensitive units are determined based on the one or more frames of the first image. The matching degree is determined between the light intensity offset values of the N photosensitive units and the preset N-dimensional vector. If the matching degree meets a preset condition, that is, if the two match, it is determined that the authentication of the to-be-authenticated camera succeeds. In this way, camera security is improved. In this solution, physical characteristics of the to-be-authenticated camera are used. For example, the light intensity offset value of the photosensitive unit of the to-be-authenticated camera is used as the to-be-authenticated fingerprint, and the identity authentication is performed on the to-be-authenticated camera based on the to-be-authenticated fingerprint. Further, a digital certificate or key does not need to be installed in the to-be-authenticated camera, and this avoids impact, on authentication security, caused by exposure of the digital certificate or key in the to-be-authenticated camera. In addition, an image of the to-be-authenticated camera is extracted, and the to-be-authenticated camera needs to provide only an inherent video or image and does not need to provide other authentication information. For example, there is no need to perform preprogramming or another modification on the to-be-authenticated camera, thereby reducing development costs.

The embodiments described in this specification may be independent solutions, or may be combined based on internal logic. These solutions all fall within the protection scope of this application.

It may be understood that, in the foregoing method embodiments, the method and operations that are implemented by the on-board control apparatus may also be implemented by a component (for example, a chip or a circuit) that can be used for the on-board control apparatus.

In the foregoing embodiments provided in this application, the method provided in this embodiment of this application is described from a perspective of interaction between devices. To implement functions in the methods provided in the foregoing embodiments of this application, the on-board control apparatus may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Division into modules in the embodiments of this application is an example, is merely logical function division, and there may be another division during actual implementation. In addition, functional modules in the embodiments of this application may be integrated into one processor, each of the modules may exist alone physically, or two or more modules may be integrated into one module. The integrated module may be implemented in a form of hardware, or may be implemented in a form of a software functional module.

The control apparatus provided in this embodiment of this application is described in detail with reference to FIG. 12 and FIG. 13. It should be understood that descriptions of the apparatus embodiments correspond to the descriptions of the method embodiments. Therefore, for content that is not described in detail, refer to the foregoing method embodiments. For brevity, details are not described herein again.

Figure 12:
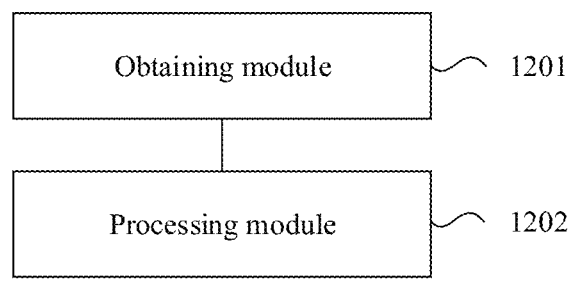
FIG. 12 is a schematic structural diagram of a control apparatus according to an embodiment of this application.

As shown in FIG. 12, an embodiment of this application further provides a control apparatus, configured to implement functions of the on-board control apparatus in the foregoing method. The apparatus may be applied to flowcharts shown in FIG. 7, FIG. 8, FIG. 10, and FIG. 11, to perform the functions of the foregoing method embodiments. For example, the apparatus may be a software module or a chip system. In this embodiment of this application, the chip system may include a chip, or may include a chip and another discrete component.

In some embodiments, the control apparatus includes: an obtaining module 1201 and a processing module 1202.

The obtaining module 1201 is configured to obtain one or more frames of a first image shot by a to-be-authenticated camera.

The processing module 1202 is configured to determine one or more light intensity offset values of N photosensitive units based on the one or more frames of the first image. The N photosensitive units are in a photosensitive layer of the to-be-authenticated camera, and the photosensitive layer includes M photosensitive units, where N≤M.

The processing module 1202 is further configured to determine a matching degree between the light intensity offset values of the N photosensitive units and a preset N-dimensional vector. If the matching degree meets a preset condition, it is determined that authentication of the to-be-authenticated camera succeeds.

In some embodiments, the processing module 1202 is specifically configured to: determine one or more light intensity offset values of the M photosensitive units based on the one or more frames of the first image, and use one or more largest light intensity offset values of N photosensitive units in the light intensity offset values of the M photosensitive units as the light intensity offset values of the N photosensitive units; or determine the light intensity offset values of the N photosensitive units based on the one or more frames of the first image and photosensitive units at N preset positions, where the N photosensitive units are the N photosensitive units at the N preset positions in the photosensitive layer of the to-be-authenticated camera.

In some embodiments, the processing module 1202 is specifically configured to: for each frame of a plurality of frames of the first image, determine the light intensity offset value of the $k^{th}$ photosensitive unit in the N photosensitive units in the first image, where 1≤k≤N; and determine an average value of light intensity offset values of the $k^{th}$ photosensitive unit in all the frames of the first image as a light intensity offset value of the $k^{th}$ photosensitive unit.

In some embodiments, the processing module 1202 is specifically configured to: for any frame of the first image, determine a difference between a light intensity value of the $k^{th}$ photosensitive unit in the first image and a light intensity value of one adjacent photosensitive unit in the first image as the light intensity offset value of the $k^{th}$ photosensitive unit in the first image, where the adjacent photosensitive unit and the $k^{th}$ photosensitive unit correspond to a same color and have a preset distance corresponding to the color.

In some embodiments, the processing module 1202 is specifically configured to: for any frame of the first image, determine an average light intensity value of light intensity values of a plurality of adjacent photosensitive units in the first image; and determine a difference between the light intensity value of the $k^{th}$ photosensitive unit in the first image and the average light intensity value as the light intensity offset value of the $k^{th}$ photosensitive unit in the first image, where each of the plurality of adjacent photosensitive units and the $k^{th}$ photosensitive unit correspond to a same color and have a preset distance corresponding to the color.

In some embodiments, the preset N-dimensional vector is one or more light intensity offset values that are of the N photosensitive units and that are determined based on one or more frames of a second image shot by the to-be-authenticated camera.

In some embodiments, the processing module 1202 is specifically configured to: determine a similarity between a first vector and the preset N-dimensional vector, where the first vector is formed by the light intensity offset values of the N photosensitive units in a preset sequence; and if the similarity is greater than a similarity threshold, determine that the authentication of the to-be-authenticated camera succeeds.

In some embodiments, the preset sequence is determined based on one or more positions of the N photosensitive units in the photosensitive layer of the to-be-authenticated camera; or the preset sequence is determined based on the magnitude of the light intensity offset values of the N photosensitive units.

Figure 13:
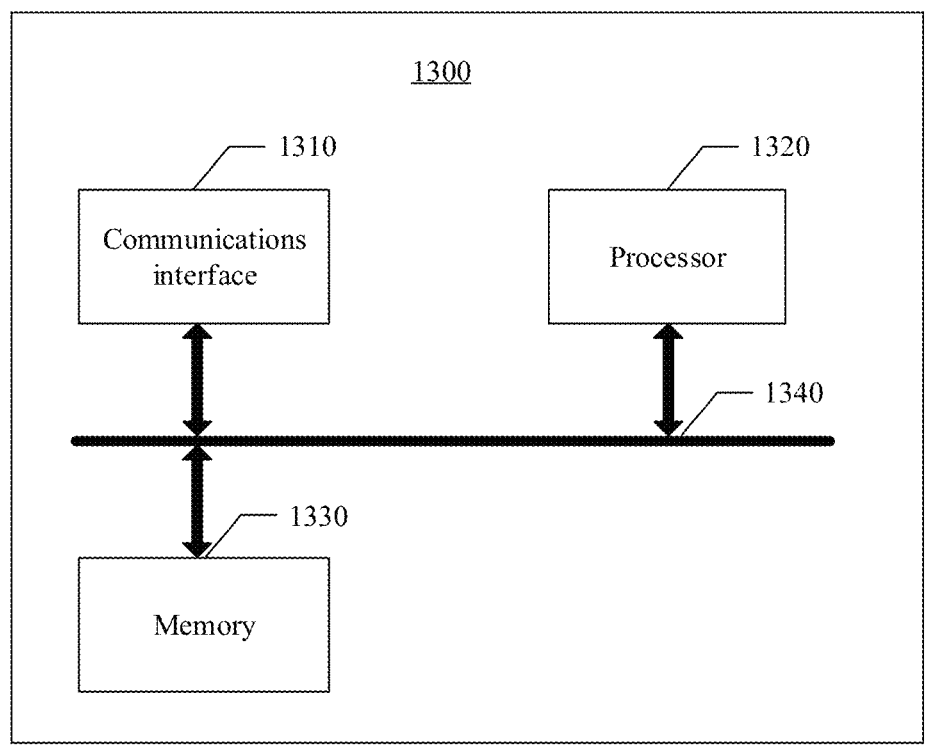
FIG. 13 is a schematic structural diagram of another control apparatus according to an embodiment of this application.

FIG. 13 shows another control apparatus according to an embodiment of this application. The apparatus 1300 shown in FIG. 13 may be an implementation of a hardware circuit of the apparatus shown in FIG. 12. The apparatus 1300 may be applied to flowcharts shown in FIG. 7, FIG. 8, FIG. 10, and FIG. 11, to perform the functions of the foregoing method embodiments. For ease of description, FIG. 13 shows only main components of the apparatus 1300.

The apparatus 1300 shown in FIG. 13 includes at least one processor 1320, configured to implement any method in FIG. 7, FIG. 8, FIG. 10, and FIG. 11 provided in this embodiment of this application.

The apparatus may further include at least one memory 1330, configured to store a program instruction and/or data. The memory 1330 is coupled to the processor 1320. The coupling in this embodiment of this application may be indirect coupling or a communication connection between apparatuses, units, or modules in an electrical form, a mechanical form, or another form, and is used for information exchange between the apparatuses, the units, or the modules. The processor 1320 may operate in collaboration with the memory 1330. The processor 1320 may execute program instructions stored in the memory 1330. At least one of the at least one memory may be included in the processor.

It should be noted that the processor in this embodiment of this application may be an integrated circuit chip, and has a signal processing capability.

In an implementation process, the operations in the foregoing method embodiments may be completed by using an integrated logic circuit of hardware in the processor or an instruction in a form of software. The processor may be a general-purpose processor, a digital signal processor (digital signal processor, DSP), a dedicated integrated chip (application specific integrated circuit, ASIC), a field programmable gate array (field programmable gate array, FPGA), or another programmable logic device, a discrete gate or transistor logic device, or a discrete hardware component.

It may be understood that the memory in the embodiments of this application may be a volatile memory or a nonvolatile memory, or may include both a volatile memory and a nonvolatile memory. It should be noted that the memory in the system and method described in this specification is intended to include but is not limited to these memories and any other memory of a suitable type.

The apparatus 1300 may further include a communications interface 1310, configured to communicate with another device through a transmission medium, so that an apparatus in the apparatus 1300 can communicate with the another device. In this embodiment of this application, the communications interface 1310 may be a transceiver, a circuit, a bus, a module, or a communications interface 1310 of another type. In this embodiment of this application, when the communications interface 1310 is a transceiver, the transceiver may include an independent receiver and an independent transmitter, or may be a transceiver integrated with a transceiver function, or an interface circuit.

The apparatus 1300 may further include a communication line 1340. The communications interface 1310, the processor 1320, and the memory 1330 may be connected to each other through the communication line 1340. The communication line 1340 may be a peripheral component interconnect (peripheral component interconnect, PCI for short) bus, an extended industry standard architecture (extended industry standard architecture, EISA for short) bus, or the like. The communication line 1340 may be classified into an address bus, a data bus, a control bus, and the like. For ease of representation, only one thick line is used to represent the bus in FIG. 13, but this does not mean that there is only one bus or only one type of bus.

For example, when the apparatus 1300 implements a function of the on-board control apparatus in the procedure shown in FIG. 8, the communications interface 1310 is configured to obtain one or more frames of a first image shot by a to-be-authenticated camera; the processor 1320 is configured to determine one or more light intensity offset values of N photosensitive units based on the one or more frames of the first image; the processor 1320 is further configured to determine a matching degree between the light intensity offset values of the N photosensitive units and a preset N-dimensional vector, and if the matching degree meets a preset condition, it is determined that authentication of the to-be-authenticated camera succeeds; and the memory 1330 is configured to store the preset N-dimensional vector.

In some embodiments, the processor 1320 is configured to determine one or more light intensity offset values of the M photosensitive units based on the one or more frames of the first image, and use one or more largest light intensity offset values of N photosensitive units in the light intensity offset values of the M photosensitive units as the light intensity offset values of the N photosensitive units.

Alternatively, the processor 1320 is configured to determine the light intensity offset values of the N photosensitive units based on the one or more frames of the first image and photosensitive units at N preset positions, where the N photosensitive units are the photosensitive units at the N preset positions in the photosensitive layer of the to-be-authenticated camera.

In some embodiments, for each frame of a plurality of frames of the first image, the processor 1320 is configured to determine the light intensity offset value of the $k^{th}$ photosensitive unit in the N photosensitive units in the first image, where $1 \leq k \leq N$; and determine an average value of light intensity offset values of the $k^{th}$ photosensitive unit in all the frames of the first image as a light intensity offset value of the $k^{th}$ photosensitive unit.

In some embodiments, for any frame of the first image, the processor 1320 is configured to determine a difference between a light intensity value of the $k^{th}$ photosensitive unit in the first image and a light intensity value of one adjacent photosensitive unit in the first image as the light intensity offset value of the $k^{th}$ photosensitive unit in the first image, where the adjacent photosensitive unit and the $k^{th}$ photosensitive unit correspond to a same color and have a preset distance corresponding to the color.

In some embodiments, for any frame of the first image, the processor 1320 is configured to determine an average light intensity value of light intensity values of a plurality of adjacent photosensitive units in the first image; and determine a difference between the light intensity value of the $k^{th}$ photosensitive unit in the first image and the average light intensity value as the light intensity offset value of the $k^{th}$ photosensitive unit in the first image, where each of the plurality of adjacent photosensitive units and the $k^{th}$ photosensitive unit correspond to a same color and have a preset distance corresponding to the color.

In some embodiments, the preset N-dimensional vector is one or more light intensity offset values that are of the N photosensitive units and that are determined based on one or more frames of a second image shot by the to-be-authenticated camera.

In some embodiments, the processor 1320 is configured to determine a similarity between a first vector and the preset N-dimensional vector, where the first vector is formed by the light intensity offset values of the N photosensitive units in a preset sequence; and if the similarity is greater than a similarity threshold, determine that the authentication of the to-be-authenticated camera succeeds.

In some embodiments, the preset sequence is determined based on one or more positions of the N photosensitive units in the photosensitive layer of the to-be-authenticated camera; or the preset sequence is determined based on the magnitude of the light intensity offset values of the N photosensitive units.

The function may be implemented by hardware, or may be implemented by hardware executing corresponding software. The hardware or the software includes one or more modules corresponding to the foregoing function.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A camera authentication method, comprising:
   obtaining one or more frames of a first image shot by a to-be-authenticated camera;
   determining one or more light intensity offset values of N photosensitive units based on the one or more frames of the first image, wherein the N photosensitive units are in a photosensitive layer of the to-be-authenticated camera, and the photosensitive layer comprises M photosensitive units, wherein N≤M; and
   determining a matching degree between the light intensity offset values of the N photosensitive units and a preset N-dimensional vector, and if the matching degree meets a preset condition, determining that authentication of the to-be-authenticated camera succeeds.

2. The method according to claim 1, wherein the determining one or more light intensity offset values of N photosensitive units based on the one or more frames of the first image comprises:
   determining one or more light intensity offset values of the M photosensitive units based on the one or more frames of the first image, and using one or more largest light intensity offset values of N photosensitive units in the light intensity offset values of the M photosensitive units as the light intensity offset values of the N photosensitive units; or
   determining the light intensity offset values of the N photosensitive units based on the one or more frames of the first image and photosensitive units at N preset positions, wherein the N photosensitive units are the photosensitive units at the N preset positions in the photosensitive layer of the to-be-authenticated camera.

3. The method according to claim 1, wherein the determining one or more light intensity offset values of N photosensitive units based on the one or more frames of the first image comprises:
   for each frame of the one or more frames of the first image, determining a light intensity offset value of a $k^{th}$ photosensitive unit in the N photosensitive units in the first image, wherein 1≤k≤N; and
   determining an average value of light intensity offset values of the $k^{th}$ photosensitive unit in all the frames of the first image as a light intensity offset value of the $k^{th}$ photosensitive unit.

4. The method according to claim 1, wherein the determining one or more light intensity offset values of N photosensitive units based on the one or more frames of the first image comprises:
   for any frame of the first image, determining a difference between a light intensity value of the $k^{th}$ photosensitive unit in the first image and a light intensity value of one adjacent photosensitive unit in the first image as the light intensity offset value of the $k^{th}$ photosensitive unit in the first image, wherein
   the adjacent photosensitive unit and the $k^{th}$ photosensitive unit correspond to a same color and have a preset distance corresponding to the color.

5. The method according to claim 1, wherein the determining one or more light intensity offset values of N photosensitive units based on the one or more frames of the first image comprises:
   for any frame of the first image, determining an average light intensity value of light intensity values of a plurality of adjacent photosensitive units in the first image; and
   determining a difference between the light intensity value of the $k^{th}$ photosensitive unit in the first image and the average light intensity value as the light intensity offset value of the $k^{th}$ photosensitive unit in the first image, wherein
   each of the plurality of adjacent photosensitive units and the $k^{th}$ photosensitive unit correspond to a same color and have a preset distance corresponding to the color.

6. The method according to claim 1, wherein the preset N-dimensional vector is one or more light intensity offset values that are of N photosensitive units and that are determined based on one or more frames of a second image shot by the to-be-authenticated camera.

7. The method according to claim 1, wherein the determining a matching degree between the light intensity offset values of the N photosensitive units and a preset N-dimensional vector, and if the matching degree meets a preset condition, determining that authentication of the to-be-authenticated camera succeeds comprises:
   determining a similarity between a first vector and the preset N-dimensional vector, wherein the first vector is formed by the light intensity offset values of the N photosensitive units in a preset sequence; and
   if the similarity is greater than a similarity threshold, determining that authentication of the to-be-authenticated camera succeeds.

8. The method according to claim 7, wherein the preset sequence is determined based on one or more positions of the N photosensitive units in the photosensitive layer of the to-be-authenticated camera; or the preset sequence is determined based on a magnitude of the light intensity offset values of the N photosensitive units.

9. A camera authentication apparatus, comprising a memory and a processor, wherein the memory is configured to store an instruction, the processor is configured to execute the instruction to:

obtain one or more frames of a first image shot by a to-be-authenticated camera;

determine one or more light intensity offset values of N photosensitive units based on the one or more frames of the first image, wherein the N photosensitive units are in a photosensitive layer of the to-be-authenticated camera, and the photosensitive layer comprises M photosensitive units, wherein N≤M; and determine a matching degree between the light intensity offset values of the N photosensitive units and a preset N-dimensional vector, and if the matching degree meets a preset condition, determine that authentication of the to-be-authenticated camera succeeds.

10. The camera authentication apparatus according to claim 9, wherein the processor is configured to execute the instruction to:

determine one or more light intensity offset values of the M photosensitive units based on the one or more frames of the first image, and use one or more largest light intensity offset values of N photosensitive units in the light intensity offset values of the M photosensitive units as the light intensity offset values of the N photosensitive units; or determine the light intensity offset values of the N photosensitive units based on the one or more frames of the first image and photosensitive units at N preset positions, wherein the N photosensitive units are the photosensitive units at the N preset positions in the photosensitive layer of the to-be-authenticated camera.

11. The camera authentication apparatus according to claim 9, wherein the processor is configured to execute the instruction to:

for each frame of of the one or more frames of the first image, determine a light intensity offset value of a $k^{th}$ photosensitive unit in the N photosensitive units in the first image, wherein 1≤k≤N; and determine an average value of light intensity offset values of the $k^{th}$ photosensitive unit in all the frames of the first image as a light intensity offset value of the $k^{th}$ photosensitive unit.

12. The apparatus camera authentication according to claim 9, wherein the processor is configured to execute the instruction to:

for any frame of the first image, determine a difference between a light intensity value of the $k^{th}$ photosensitive unit in the first image and a light intensity value of one adjacent photosensitive unit in the first image as the light intensity offset value of the $k^{th}$ photosensitive unit in the first image, wherein the adjacent photosensitive unit and the $k^{th}$ photosensitive unit correspond to a same color and have a preset distance corresponding to the color.

13. The camera authentication apparatus according to claim 9, wherein the processor is configured to execute the instruction to:

for any frame of the first image, determine an average light intensity value of light intensity values of a plurality of adjacent photosensitive units in the first image; and determine a difference between the light intensity value of the $k^{th}$ photosensitive unit in the first image and the average light intensity value as the light intensity offset value of the $k^{th}$ photosensitive unit in the first image, wherein each of the plurality of adjacent photosensitive units and the $k^{th}$ photosensitive unit correspond to a same color and have a preset distance corresponding to the color.

14. The camera authentication apparatus according to claim 9, wherein the preset N-dimensional vector is one or more light intensity offset values that are of N photosensitive units and that are determined based on one or more frames of a second image shot by the to-be-authenticated camera.

15. The camera authentication apparatus according to claim 9, wherein the processor is configured to execute the instruction to:

determine a similarity between a first vector and the preset N-dimensional vector, wherein the first vector is formed by the light intensity offset values of the N photosensitive units in a preset sequence; and if the similarity is greater than a similarity threshold, determine that the authentication of the to-be-authenticated camera succeeds.

16. The camera authentication apparatus according to claim 15, wherein the preset sequence is determined based on one or more positions of the N photosensitive units in the photosensitive layer of the to-be-authenticated camera; or the preset sequence is determined based on a magnitude of the light intensity offset values of the N photosensitive units.

17. The camera authentication apparatus according to claim 9, wherein the camera authentication apparatus is applied in a vehicle.

\* \* \* \* \*